US012705924B2

(12) United States Patent
Kim et al.

(10) Patent No.: US 12,705,924 B2
(45) Date of Patent: Aug. 11, 2026

(54) FINGERPRINT SENSOR AND DISPLAY DEVICE INCLUDING THE SAME

(71) Applicant: Samsung Display Co., Ltd., Yongin-Si (KR)

(72) Inventors: Il Nam Kim, Yongin-si (KR); Tae Kyung Ahn, Yongin-si (KR); Jae Kyoung Kim, Yongin-si (KR); Seung Hyun Moon, Yongin-si (KR); Hyun Dae Lee, Yongin-si (KR); Hyoung Wook Jang, Yongin-si (KR); Kang Bin Jo, Yongin-si (KR); Go Eun Cha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/977,967

(22) Filed: Dec. 12, 2024

(65) Prior Publication Data

US 2025/0322688 A1 Oct. 16, 2025

(30) Foreign Application Priority Data

Apr. 16, 2024 (KR) ........................ 10-2024-0050513

(51) Int. Cl.
*G06V 40/13* (2022.01)
*G06F 3/042* (2006.01)

(52) U.S. Cl.
CPC .......... *G06V 40/1318* (2022.01); *G06F 3/042* (2013.01); *G06F 2203/04102* (2013.01)

(58) Field of Classification Search
None
See application file for complete search history.

(56) References Cited

U.S. PATENT DOCUMENTS

| | | | |
|---|---|---|---|
| 11,158,258 B2 | 10/2021 | Cha et al. | |
| 11,694,612 B2 | 7/2023 | Lee et al. | |
| 12,106,601 B2 | 10/2024 | Kim et al. | |
| 2020/0380234 A1* | 12/2020 | Li | G06V 40/1318 |
| 2021/0158751 A1* | 5/2021 | Cha | H10K 59/65 |
| 2021/0384453 A1* | 12/2021 | Kawata | H10F 39/198 |
| 2023/0360427 A1 | 11/2023 | Kim et al. | |

FOREIGN PATENT DOCUMENTS

| | | |
|---|---|---|
| CN | 117037706 A | 11/2023 |
| KR | 10-2021-0064483 A | 6/2021 |
| KR | 10-2023-0041905 A | 3/2023 |
| KR | 10-2023-0157565 A | 11/2023 |

* cited by examiner

*Primary Examiner* — Joseph R Haley
(74) *Attorney, Agent, or Firm* — Innovation Counsel LLP

(57) ABSTRACT

Provided are a fingerprint sensor and a display device including the same. A fingerprint sensor includes a read-out line extending in a first direction, first and second light receiving elements receiving light, a first sensor transistor configured to control a sensing current based on a voltage of a sensor node, a second sensor transistor configured to discharge the sensor node to a first initialization voltage in response to a reset signal, a third sensor transistor electrically connecting a first electrode of the first sensor transistor to the read-out line in response to a gate signal, a fourth sensor transistor electrically connecting the sensor node to the first light receiving element in response to a first control signal, and a fifth sensor transistor electrically connecting the sensor node to the second light receiving element in response to a second control signal.

20 Claims, 19 Drawing Sheets

CCL1 CCL2 CCL3 CCL4 CCL5 CCL6 CCL7 CCL8 CCL9

EA3 EA2 EA1 EA2 PDA1 SC11 PDA3

SL1 PC11 PC12 PC13 PC14 PC15 PC16 PC17 PC18 CRW1

PDA2 SL2 PC21 PC22 PC23 PC24 PC25 PC26 PC27 PC28 PDA4 CRW2 UG1

PDA5 SL3 PC31 PC32 PC33 PC34 PC35 PC36 PC37 PC38 PDA7 CRW3

PDA6 SL4 PC41 PC42 PC43 PC44 PC45 PC46 PC47 PC48 PDA8 CRW4 UG2

EA1 EA2 EA3 EA2 SC21 TGL1 TGL2 ROL TGL3 TGL4

EA: EA1, EA2, EA3
PDA: PDA1, PDA2, PDA3, PDA4
PDA5, PDA6, PDA7, PDA8
TGL: TGL1, TGL2, TGL3, TGL4

PD: PD1, PD2, PD3, PD4

FINGERPRINT SENSOR AND DISPLAY DEVICE INCLUDING THE SAME

CROSS-REFERENCE TO RELATED APPLICATION

This application claims priority to Korean Patent Application No. 10-2024-0050513 filed on Apr. 16, 2024, and all the benefits accruing therefrom under 35 U.S.C. § 119, the content of which in its entirety is herein incorporated by reference.

BACKGROUND

1. Technical Field

The present disclosure relates to a fingerprint sensor and a display device including the same.

2. Description of the Related Art

With the advance of information-oriented society, more and more demands are placed on display devices for displaying images in various ways. For example, display devices are employed in various electronic devices such as smartphones, digital cameras, laptop computers, navigation devices, and smart televisions. In the display device, since each of pixels of a display panel includes a light emitting element capable of emitting light by itself, an image can be displayed without a backlight unit providing light to the display panel.

The display device may include a display panel that displays an image, an optical sensor that detects light, a fingerprint sensor that detects a person's fingerprint, and an illuminance sensor that detects surrounding brightness. With diversification of electronic devices employing display devices, it is required for the display devices to be provided in various designs. For example, the display device may widen a display area for displaying an image by removing a sensor device such as a light sensor, a fingerprint sensor, or an illumination sensor that are separately disposed in a non-display area.

SUMMARY

Aspects of the present disclosure provide a fingerprint sensor capable of maintaining its sensitivity in a high-resolution display product and a display device including the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an embodiment of the present disclosure, a fingerprint sensor includes a read-out line extending in a first direction, first and second light receiving elements receiving light, a first sensor transistor configured to control a sensing current based on a voltage of a sensor node, a second sensor transistor configured to discharge the sensor node to a first initialization voltage in response to a reset signal, a third sensor transistor electrically connecting a first electrode of the first sensor transistor to the read-out line in response to a gate signal, a fourth sensor transistor electrically connecting the sensor node to the first light receiving element in response to a first control signal, and a fifth sensor transistor electrically connecting the sensor node to the second light receiving element in response to a second control signal.

The first light receiving element may be configured to drive during a first sensing frame and the second light receiving element may be configured to drive during a second sensing frame after the first sensing frame. Each of the first and second sensing frames may include a reset period in which the second sensor transistor is turned on to discharge the sensor node, a hold period in which the first or second light receiving element receives light after the reset period, and a sensing period in which the first and third sensor transistors are turned on after the hold period.

The fourth sensor transistor may be configured to be turned on during the sensing period of the first sensing frame to supply a sensing signal from the first light receiving element to the read-out line. The fifth sensor transistor may be configured to be turned on during the sensing period of the second sensing frame to supply a sensing signal by the second light receiving element to the read-out line.

The fingerprint sensor may further include third and fourth light receiving elements configured to receive light, a sixth sensor transistor electrically connecting the sensor node to the third light receiving element in response to a third control signal, and a seventh sensor transistor electrically connecting the sensor node to the fourth light receiving element in response to a fourth control signal.

The third light receiving element may be configured to drive during a third sensing frame after the second sensing frame, the fourth light receiving element may be configured to drive during a fourth sensing frame after the third sensing frame. Each of the third and fourth sensing frames may include a reset period in which the second sensor transistor is turned on to discharge the sensor node, a hold period in which the third or fourth light receiving element receives light after the reset period, and a sensing period in which the first and third sensor transistors are turned on after the hold period. The sixth sensor transistor may be configured to be turned on during the sensing period of the third sensing frame to supply a sensing signal from the third light receiving element to the read-out line. The seventh sensor transistor may be configured to be turned on during the sensing period of the fourth sensing frame to supply a sensing signal from the fourth light receiving element to the read-out line.

The second sensor transistor may include an oxide-based semiconductor. The first, and third to seventh sensor transistors may include a silicon-based semiconductor.

The second, and fourth to seventh sensor transistors may include an oxide-based semiconductor. The first and third sensor transistors may include a silicon-based semiconductor.

According to an embodiment of the present disclosure, a display device includes a plurality of pixel circuits sequentially disposed in a first circuit row, a plurality of pixel circuits sequentially disposed in a second circuit row following the first circuit row, a first sensor circuit disposed between the pixel circuits in the first and second circuit rows, a plurality of light emitting elements electrically connected to the plurality of pixel circuits, respectively, and disposed in the first and second circuit rows, first and second light receiving elements electrically connected to the first sensor circuit and disposed in the first and second circuit rows, and a read-out line electrically connected to the first sensor circuit and extending in a first direction. The first sensor circuit is configured to supply a sensing signal from the first light receiving element to the read-out line during a first frame period of a first sensing frame, and supply a sensing signal from the second light receiving element to the read-out line during a first frame period of a second sensing frame after the first sensing frame.

The display device may further include a plurality of pixel circuits sequentially disposed in a third circuit row following the second circuit row, a plurality of pixel circuits sequentially disposed in a fourth circuit row following the third circuit row, a second sensor circuit disposed between the pixel circuits in the third and fourth circuit rows and electrically connected to the read-out line, and third and fourth light receiving elements electrically connected to the second sensor circuit and disposed in the third and fourth circuit rows.

The second sensor circuit may be configured to supply a sensing signal from the third light receiving element to the read-out line during a second frame period after the first frame period of the first sensing frame, and supply a sensing signal from the fourth light receiving element to the read-out line during a second frame period after the first frame period of the second sensing frame.

The display device may further include first and second control lines extending in the first direction and configured to supply first and second control signals to the first and second sensor circuits, respectively.

Each of the first and second sensor circuits may include a first sensor transistor configured to control a sensing current based on a voltage of a sensor node, a second sensor transistor configured to discharge the sensor node to a first initialization voltage in response to a reset signal, a third sensor transistor electrically connecting a first electrode of the first sensor transistor to the read-out line in response to a gate signal, a fourth sensor transistor electrically connecting the sensor node to the first light receiving element in response to the first control signal, and a fifth sensor transistor electrically connecting the sensor node to the second light receiving element in response to the second control signal.

The third sensor transistor of the first sensor circuit may be configured to be turned on in response to a first gate signal applied to the pixel circuits disposed in the first or second circuit row. The third sensor transistor of the second sensor circuit may be configured to be turned on in response to a second gate signal applied to the pixel circuits disposed in the third or fourth circuit row.

The first and second light receiving elements may overlap the pixel circuits disposed in the first and second circuit rows. The third and fourth light receiving elements may overlap the pixel circuits disposed in the third and fourth circuit rows.

According to an embodiment of the present disclosure, a display device includes a plurality of pixel circuits sequentially disposed in a first circuit row, a first sensor circuit disposed between the pixel circuits in the first circuit row, a first read-out line electrically connected to the first sensor circuit and extending in a first direction, a plurality of pixel circuits sequentially disposed in a second circuit row following the first circuit row, a second sensor circuit disposed between the pixel circuits in the second circuit row, a second read-out line electrically connected to the second sensor circuit and extending in the first direction, a first MUX transistor configured to be turned on based on a first MUX signal, and connected to the first read-out line, a second MUX transistor configured to be turned on based on a second MUX signal, and connected to the second read-out line, and a read-out line selectively connected to the first or second read-out line by turning on the first or second MUX transistor.

The display device may further include a first light receiving element electrically connected to the first sensor circuit and disposed in the first circuit row, a second light receiving element electrically connected to the first sensor circuit and disposed in the second circuit row, a third light receiving element electrically connected to the second sensor circuit and disposed in the first circuit row, and a fourth light receiving element electrically connected to the second sensor circuit and disposed in the second circuit row.

The first sensor circuit may be configured to supply a sensing signal from the first light receiving element to the first read-out line during a first frame period of a first sensing frame. The second sensor circuit may be configured to supply a sensing signal from the third light receiving element to the second read-out line during a second frame period after the first frame period of the first sensing frame.

The first sensor circuit may be configured to supply a sensing signal from the second light receiving element to the first read-out line during a first frame period of a second sensing frame after the first sensing frame. The second sensor circuit may be configured to supply a sensing signal from the fourth light receiving element to the second read-out line during a second frame period after the first frame period of the second sensing frame.

The display device may further include first and second control lines extending in a second direction intersecting the first direction and configured to supply first and second control signals to the first and second sensor circuits, respectively.

Each of the first and second sensor circuits may include a first sensor transistor configured to control a sensing current based on a voltage of a sensor node, a second sensor transistor configured to discharge the sensor node to a first initialization voltage in response to a reset signal, a third sensor transistor electrically connecting a first electrode of the first sensor transistor to the first or second read-out line in response to a gate signal, a fourth sensor transistor electrically connecting the sensor node to the first light receiving element based on the first control signal, and a fifth sensor transistor electrically connecting the sensor node to the second light receiving element in response to the second control signal.

According to an embodiment of the disclosure, the fingerprint sensor and the display device including the same may include one light emitting element corresponding to one pixel circuit and a plurality of light receiving elements corresponding to one sensor circuit, thereby maintaining the sensitivity of the fingerprint sensor in a high-resolution display product.

It should be noted that effects of the present disclosure are not limited to those described above and other effects of the present disclosure will be apparent to those skilled in the art from the following descriptions.

BRIEF DESCRIPTION OF THE DRAWINGS

The above and other features of the inventive concept will become more apparent by describing in detail embodiments thereof with reference to the accompanying drawings, in which.

DETAILED DESCRIPTION OF THE EMBODIMENTS

Figure 1:
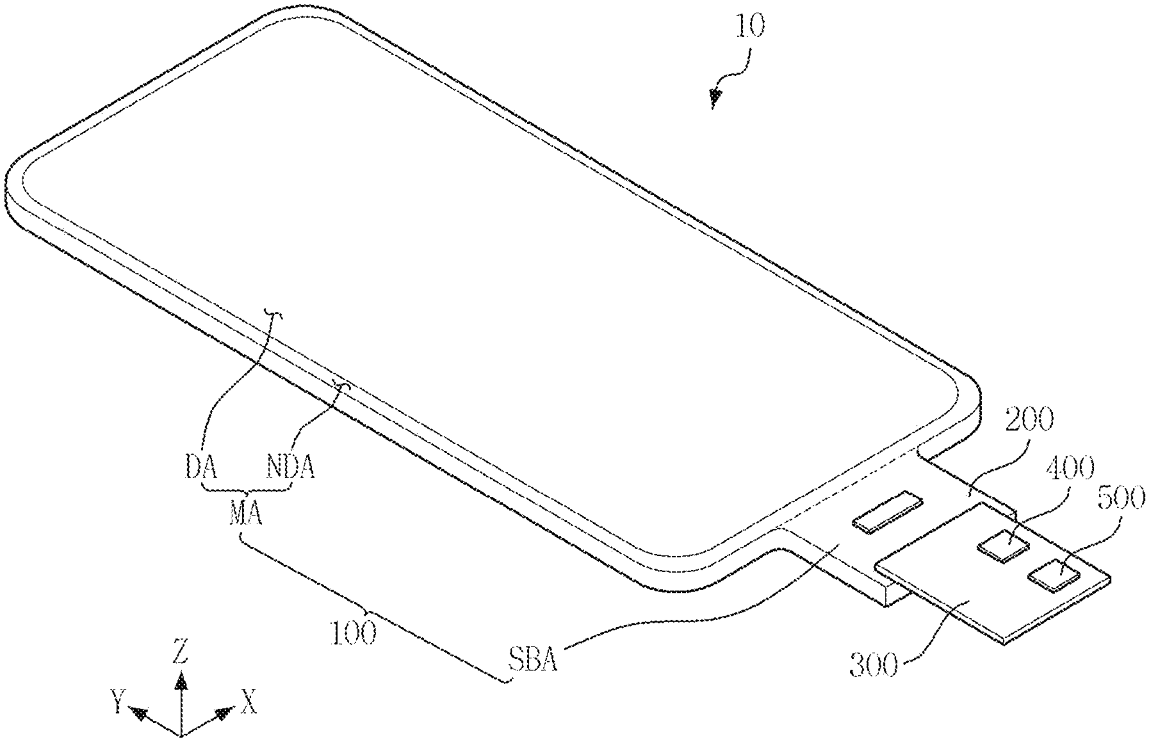
FIG. 1 is a perspective view showing a display device according to one embodiment.

Embodiments of the present disclosure address a problem in which any of a plurality of touch lines overlapping data fan-out line or scan fan-out line produce a parasitic capacitance between the touch line and the data fan-out line or between the touch line and the scan fan-out line. Due to the parasitic capacitance, a touch signal of the touch line may be affected by a data voltage of the data fan-out line or a scan control signal of the scan fan-out line, and thus, a touch sensing error may occur.

Embodiments of the present disclosure provide a display device capable of preventing a touch signal of a touch line from being affected by a data voltage of a data fan-out line or a scan control signal of a scan fan-out line.

The present disclosure now will be described more fully hereinafter with reference to the accompanying drawings, in which various embodiments are shown. This present disclosure may, however, be embodied in many different forms, and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms "first," "second," "third" etc. may be used herein to describe various elements, components, regions, layers or sections, these elements, components, regions, layers or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting.

As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

As used herein, the terms "comprises," "comprising," "includes," and "including" mean the presence of stated features, regions, integers, steps, operations, elements, or components, but do not preclude the presence or addition of one or more other features, regions, integers, steps, operations, elements, components, or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present disclosure will be described in detail with reference to the accompanying drawings.

FIG. 1 is a perspective view showing a display device according to one embodiment.

Referring to FIG. 1, a display device 10 may be applied to portable electronic devices such as a mobile phone, a smartphone, a tablet personal computer, a mobile communication terminal, an electronic organizer, an electronic book, a portable multimedia player (PMP), a navigation system, an ultra-mobile PC (UMPC) or the like. For example, the display device 10 may be applied as a display unit of a television, a laptop, a monitor, a billboard, or an Internet-of-Things (IoT) device. For another example, the display device 10 may be applied to wearable devices such as a smart watch, a watch phone, a glasses type display, or a head mounted display (HMD).

The display device 10 may have a planar shape similar to a quadrilateral shape. For example, the display device 10 may have a shape similar to a quadrilateral shape, in a plan view, having short sides in an X-axis direction and long sides in a Y-axis direction. The corner where the short side extending in the X-axis direction and the long side extending in the Y-axis direction meet may be rounded to have a predetermined curvature or may be right-angled. The planar shape of the display device 10 is not limited to a quadrilateral shape and may be formed in a shape similar to another polygonal shape, a circular shape, or elliptical shape.

The display device 10 may include a display panel 100, a display driver 200, a circuit board 300, a touch driver 400, and a power supply unit 500.

The display panel 100 may include a main region MA and a sub-region SBA.

The main region MA may include the display area DA including pixels displaying an image and the non-display area NDA disposed around the display area DA. The display area DA may emit light from a plurality of emission areas or a plurality of opening areas. For example, the display panel 100 may include a pixel circuit including switching elements, a pixel defining film defining an emission area or an opening area, and a self-light emitting element.

For example, the self-light emitting element may include one of an organic light emitting diode (LED) including an organic light emitting layer, a quantum dot LED including a quantum dot light emitting layer, an inorganic LED including an inorganic semiconductor, and a micro-LED, but the configuration of the self-light emitting element is not limited thereto.

The non-display area NDA may be an area outside the display area DA. The non-display area NDA may be defined as an edge area of the main region MA of the display panel 100. The non-display area NDA may include a scan driver (not illustrated) that supplies gate signals to the gate lines, and fan-out lines (not illustrated) that connect the display driver 200 to the pixels disposed in the display area DA.

The sub-region SBA may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include the display driver 200 and a pad portion connected to the circuit board 300. Optionally, the sub-region SBA may be omitted, and the display driver 200 and the pad portion may be disposed in the non-display area NDA.

The display driver 200 may output signals and voltages for driving the display panel 100. The display driver 200 may supply data voltages to data lines. The display driver 200 may supply a power voltage to the power line and may supply a scan control signal to the scan driver. The display driver 200 may receive a sensing signal through a read-out line. The display driver 200 may be formed as an integrated circuit (IC) and mounted on the display panel 100 by a chip on glass (COG) method, a chip on plastic (COP) method, or an ultrasonic bonding method. For example, the display driver 200 may be disposed in the sub-region SBA, and may overlap the main region MA in the thickness direction (Z-axis direction) by bending of the sub-region SBA. For another example, the display driver 200 may be mounted on the circuit board 300.

The circuit board 300 may be attached to the pad portion of the display panel 100 by using an anisotropic conductive film (ACF). Lead lines of the circuit board 300 may be electrically connected to the pad portion of the display panel 100. The circuit board 300 may be a flexible printed circuit board, a printed circuit board, or a flexible film such as a chip on film.

The touch driver 400 may be mounted on the circuit board 300. The touch driver 400 may be electrically connected to a touch sensing unit of the display panel 100. The touch driver 400 may supply a touch driving signal to a plurality of touch electrodes of the touch sensing unit and may sense an amount of change in capacitance between the plurality of touch electrodes. For example, the touch driving signal may be a pulse signal having a predetermined frequency. The touch driver 400 may calculate whether an input is made and input coordinates based on an amount of change in capacitance between the plurality of touch electrodes. The touch driver 400 may be formed as an integrated circuit (IC).

The power supply unit 500 may be disposed on the circuit board 300 to supply a power voltage to the display driver 200 and the display panel 100. The power supply unit 500 may generate a driving voltage to supply it to a driving voltage line and may generate a common voltage to supply it to a common electrode that is common to the light emitting elements of a plurality of pixels. For example, the driving voltage may be a high potential voltage for driving the light emitting element and the common voltage may be a low potential voltage for driving the light emitting element. The power supply unit 500 may generate an initialization voltage to supply it to an initialization voltage line, generate a reference voltage to supply it to a reference voltage line, generate a bias voltage to supply it to a bias voltage line, and generate a reset voltage to supply it to a reset voltage line.

Figure 2:
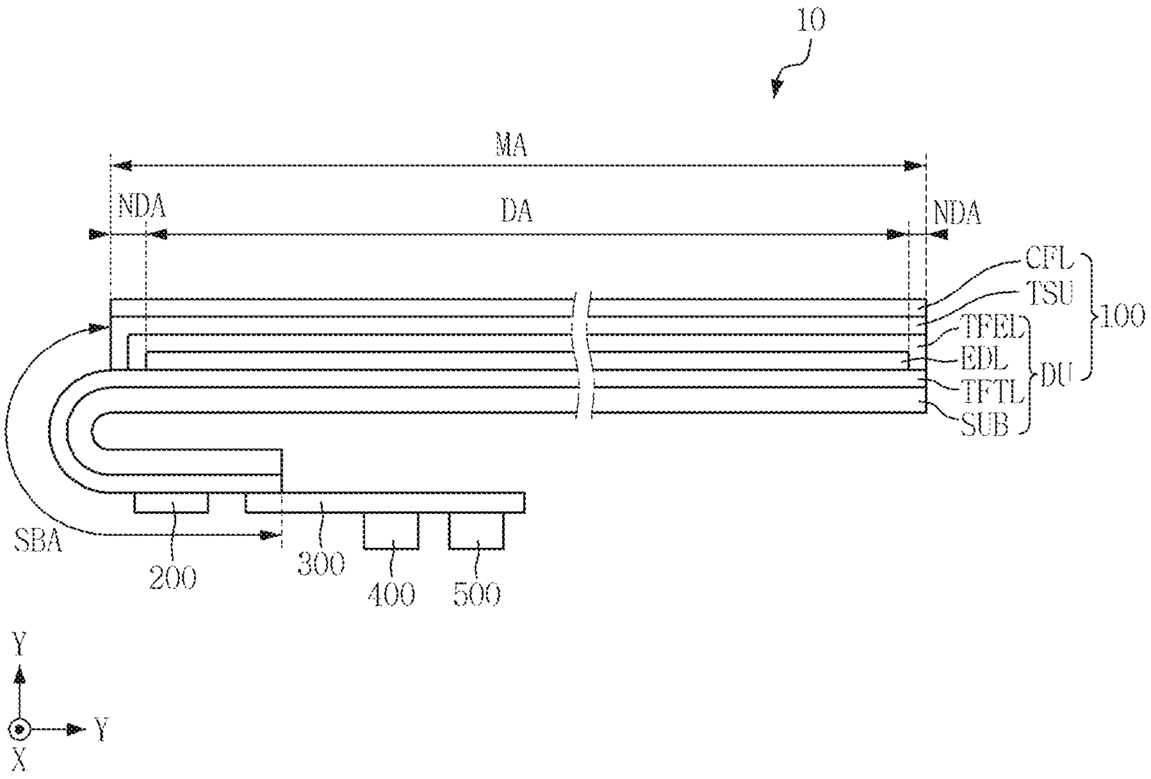
FIG. 2 is a cross-sectional view illustrating a display device according to one embodiment.

FIG. 2 is a cross-sectional view illustrating a display device according to one embodiment.

Referring to FIG. 2, the display panel 100 may include a display unit DU, a touch sensing unit TSU, and a color filter layer CFL. The display unit DU may include a substrate SUB, a transistor layer TFTL, a light emitting element layer EDL, and an encapsulation layer TFEL.

The substrate SUB may be a base substrate or a base member. The substrate SUB may be a flexible substrate which can be bent, folded or rolled. For example, the substrate SUB may include a polymer resin such as polyimide (PI), but the configuration of the substrate is not limited thereto. For another example, the substrate SUB may include a glass material or a metal material.

The transistor layer TFTL may be disposed on the substrate SUB. The transistor layer TFTL may include a plurality of transistors constituting a pixel and a fingerprint sensor. The transistor layer TFTL may further include scan lines, data lines, power lines, read-out lines, gate control lines, fan-out lines that connect the display driver 200 to the data lines, and lead lines that connect the display driver 200 to the pad portion. Each of the transistors may include a semiconductor region, a source electrode, a drain electrode, and a gate electrode. For example, when the scan driver is formed on one side of the non-display area NDA of the display panel 100, the scan driver may include transistors.

The transistor layer TFTL may be disposed in the display area DA, the non-display area NDA, and the sub-region SBA. The transistors, scan lines, data lines, power lines, and read-out lines of the transistor layer TFTL may be disposed in the display area DA. The scan control lines and fan-out lines of the transistor layer TFTL may be disposed in the non-display area NDA. The lead lines of the transistor layer TFTL may be disposed in the sub-region SBA.

The light emitting element layer EDL may be disposed on the transistor layer TFTL. The light emitting element layer EDL may include a light emitting element of the pixel, a light receiving element of the fingerprint sensor, and a pixel defining film that defines the pixel and the fingerprint sensor. The light emitting element may emit light by being formed of a pixel electrode, a light emitting layer, and a common electrode sequentially stacked, and the light receiving element may receive light by being formed of a sensor electrode, a light receiving layer, and a common electrode sequentially stacked. The light emitting elements and light receiving elements of the light emitting element layer EDL may be disposed in the same layer in the display area DA.

For example, the light emitting layer may be an organic light emitting layer including an organic material. The light emitting layer may include a hole transporting layer, an organic light emitting layer, and an electron transporting layer. When the pixel electrode receives a predetermined voltage through the transistor of the transistor layer TFTL and the common electrode receives a cathode voltage, holes may move to the organic light emitting layer through the hole transporting layer, electrons may move to the organic light emitting layer through the electron transporting layer, and the holes and the electrons may combine with each other in the organic light emitting layer to emit light. For example, the pixel electrode may be an anode electrode and the common electrode may be a cathode electrode, but the present disclosure is not limited thereto.

For another example, the plurality of light emitting elements may include a quantum dot light emitting diode including a quantum dot light emitting layer, an inorganic light emitting diode including an inorganic semiconductor, or a micro light emitting diode.

The light receiving element may receive light and convert light energy into an electrical signal. When a user's finger touches the display panel 100, light emitted from the light emitting element may be reflected by the finger, and the light receiving element may receive the reflected light. A sensing signal of the fingerprint sensor that receives light reflected by the ridges of the finger may be different from a sensing signal of the fingerprint sensor that receives light reflected by the valleys of the finger. The main processor may distinguish the difference between these sensing signals to generate sensing data, and based on the sensing data, may determine whether the ridges of the finger have been touched or the valleys of the finger have been touched. Accordingly, the display device 10 may recognize the pattern of the user's fingerprint based on the sensing data. For example, the light receiving element may be an organic photodiode, but the configuration of the is not limited thereto.

The encapsulation layer TFEL may cover the top surface and the side surface of the light emitting element layer EDL and may protect the light emitting element layer EDL. The encapsulation layer TFEL may include at least one inorganic layer and at least one organic layer for encapsulating the light emitting element layer EDL.

The touch sensing unit TSU may be disposed on the encapsulation layer TFEL. The touch sensing unit TSU may include a plurality of touch electrodes for sensing a user's touch in a capacitive manner and touch lines connecting the plurality of touch electrodes to the touch driver 400. The plurality of touch electrodes of the touch sensing unit TSU may be disposed in a touch sensor area overlapping the display area DA. The touch lines of the touch sensing unit TSU may be disposed in a touch peripheral area that overlaps the non-display area NDA. For example, the touch sensing unit TSU may sense the user's touch by using a mutual capacitance method or a self-capacitance method.

For another example, the touch sensing unit TSU may be disposed on a separate substrate disposed on the display unit DU. In this case, the substrate supporting the touch sensing unit TSU may be a base member that encapsulates the display unit DU.

The color filter layer CFL may be disposed on the touch sensing unit TSU. The color filter layer CFL may include a plurality of color filters respectively corresponding to the plurality of emission areas. Each of the color filters may selectively transmit light of a specific wavelength and may block or absorb light of a different wavelength. The color filter layer CFL may absorb a part of light coming from the outside of the display device 10 to reduce reflected light due to external light. Accordingly, the color filter layer CFL may prevent color distortion caused by reflection of the external light.

Since the color filter layer CFL is directly disposed on the touch sensing unit TSU, the display device 10 may not require a separate substrate for the color filter layer CFL. Therefore, the thickness of the display device 10 may be relatively reduced.

The sub-region SBA of the display panel 100 may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include the display driver 200 and the pad portion electrically connected to the circuit board 300.

Figure 3:
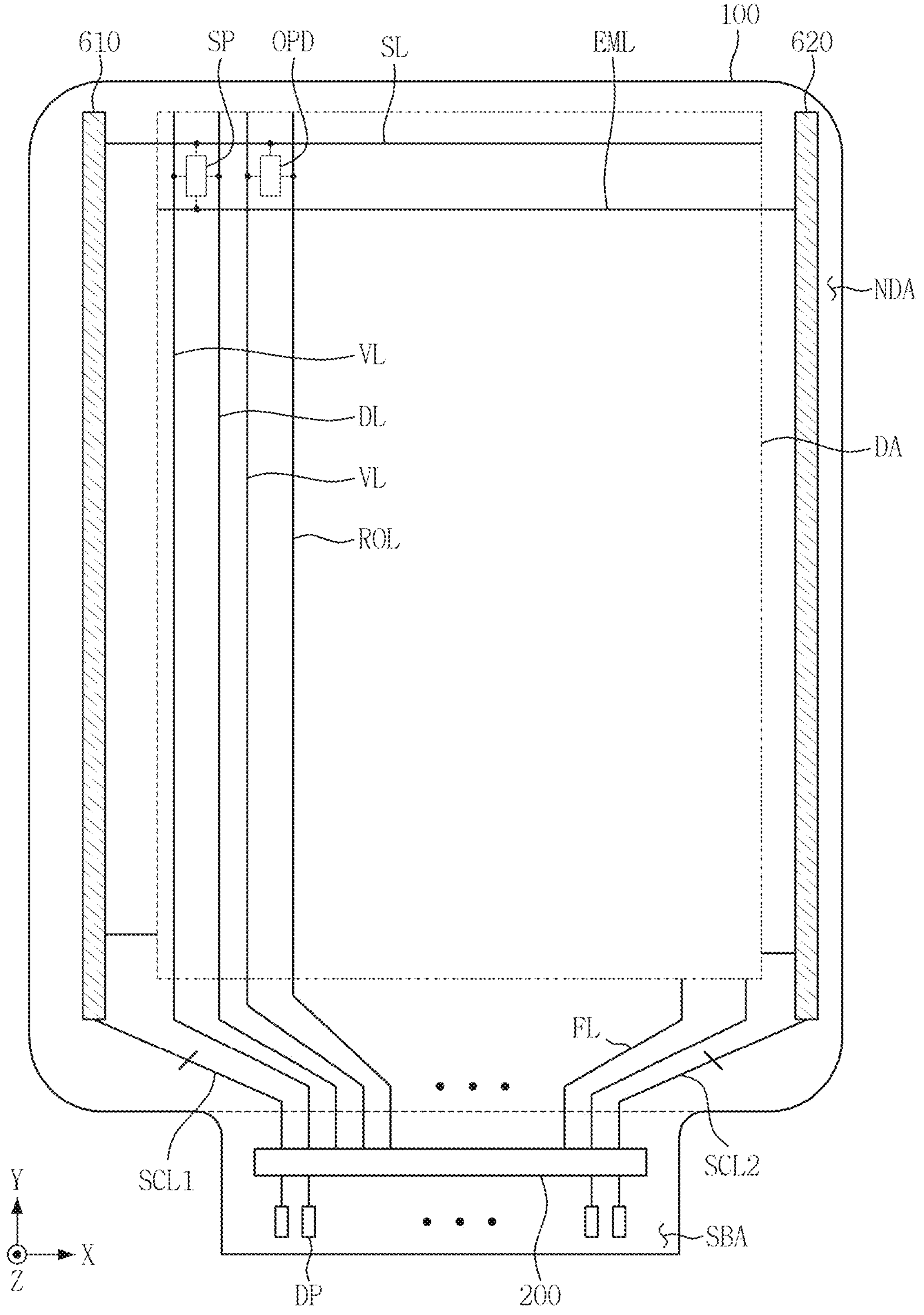
FIG. 3 is a plan view illustrating a display unit of a display device according to one embodiment.
Figure 4:
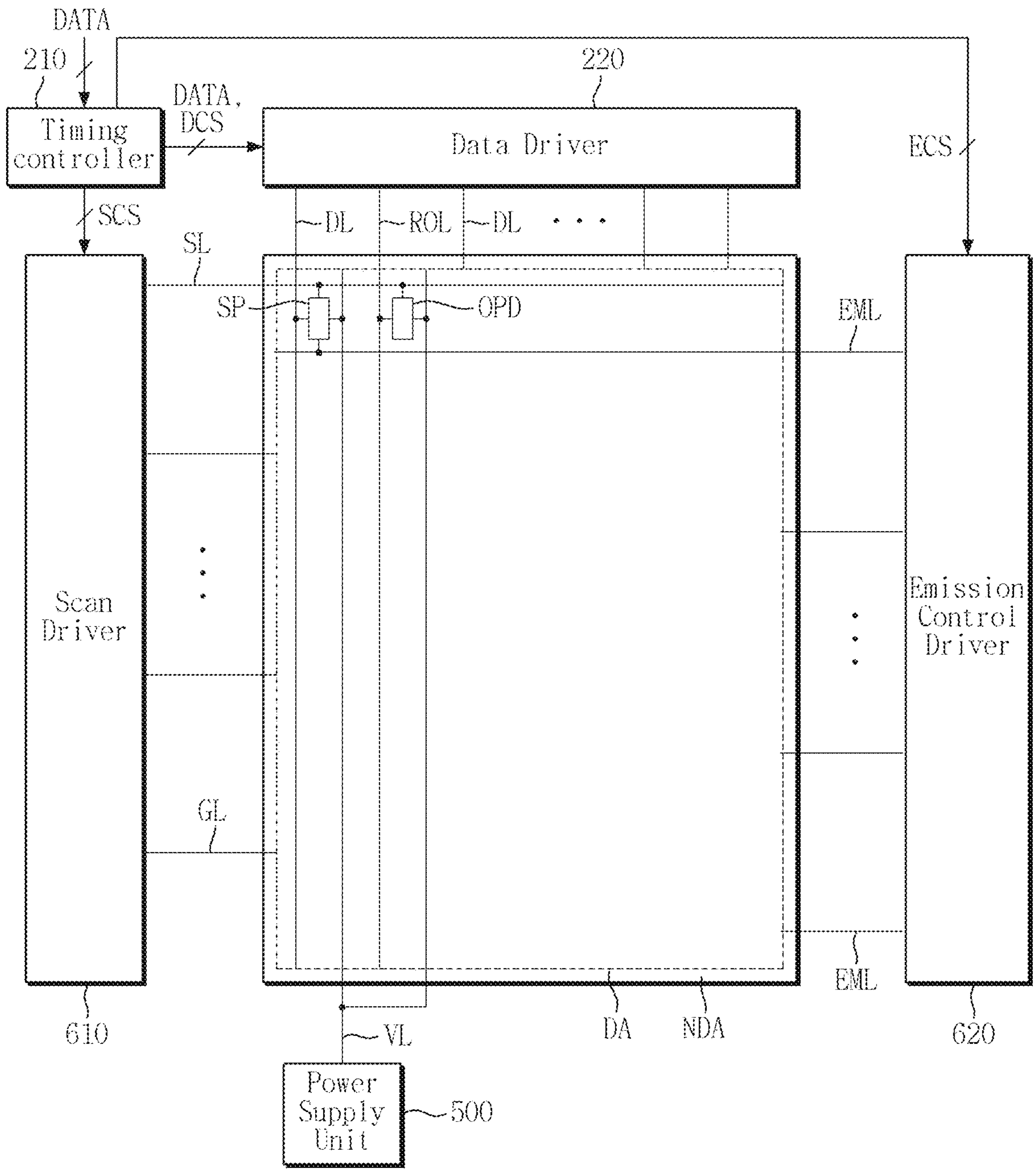
FIG. 4 is a block diagram illustrating a display panel and a display driver according to one embodiment.

FIG. 3 is a plan view illustrating a display unit of a display device according to one embodiment. FIG. 4 is a block diagram illustrating a display panel and a display driver according to one embodiment.

Referring to FIGS. 3 and 4, the display panel 100 may include the display area DA, the non-display area NDA, and the sub-region SBA. The display area DA may include pixels SP, fingerprint sensors OPD, power lines VL, data lines DL, read-out lines ROL, scan lines SL, and emission control lines EML.

Each of the plurality of pixels SP may be connected to the scan line SL, the emission control line EML, the data line DL, and the power line VL. Each of the pixels SP may include at least one transistor, a light emitting element and a capacitor.

Each of the plurality of fingerprint sensors OPD may be connected to the scan line SL, the power line VL, and the read-out line ROL. Each of the plurality of fingerprint sensors OPD may include at least one transistor and at least one light receiving element.

The scan lines SL may extend in the X-axis direction and may be spaced apart from each other in the Y-axis direction that crosses the X-axis direction. The scan lines SL may sequentially supply scan signals to the pixels SP and the fingerprint sensors OPD.

The emission control lines EML may extend in the X-axis direction and may be spaced apart from each other in the Y-axis direction. The emission control lines EML may sequentially supply emission signals to the pixels SP.

The data lines DL may extend in the Y-axis direction and may be spaced apart from each other in the X-axis direction. The data lines DL may supply the data voltage to the pixels SP. The data voltage may determine the luminance of each of the pixels SP.

The power lines VL may extend in the Y-axis direction and may be spaced apart from each other in the X-axis direction. The power line VL may supply a power voltage to the pixels SP and the fingerprint sensors OPD. Here, the power voltage may be a driving voltage, a common voltage, an initialization voltage, a reference voltage, a bias voltage, or a reset voltage. The driving voltage may be a high potential voltage for driving the light emitting element and the common voltage may be a low potential voltage for driving the light emitting element and the light receiving element.

The non-display area NDA may surround the display area DA. The non-display area NDA may include a scan driver 610, an emission control driver 620, fan-out lines FL, a first scan control line SCL1, and a second scan control line SCL2.

The fan-out lines FL may extend from the display driver 200 to the display area DA. The fan-out lines FL may supply the data voltage received from the display driver 200 to the data lines DL, supply the power voltage received from the display driver 200 to the power lines VL, and supply the sensing signal received from the read-out line ROL to the display driver 200. Accordingly, the display driver 200 may drive the pixels SP and the fingerprint sensors OPD.

The first scan control line SCL1 may extend from the display driver 200 to the scan driver 610. The first scan control line SCL1 may supply a scan control signal SCS received from the display driver 200 to the scan driver 610.

The second scan control line SCL2 may extend from the display driver 200 to the emission control driver 620. The second scan control line SCL2 may supply an emission control signal ECS received from the display driver 200 to the emission control driver 620.

The sub-region SBA may extend from one side of the non-display area NDA. The sub-region SBA may include the display driver 200 and the pad portion DP. The pad portion DP may be disposed closer to one edge of the sub-region SBA than the display driver 200. The pad portion DP may be electrically connected to the circuit board 300 through an anisotropic conductive film (ACF).

The display driver 200 may include a timing controller 210 and a data driver 220.

The timing controller 210 may receive digital video data DATA and timing signals from the circuit board 300. The timing controller 210 may generate, based on the timing signals, a data control signal DCS to control the operation timing of the data driver 220, the scan control signal SCS to control the operation timing of the scan driver 610, and the emission control signal ECS to control the operation timing of the emission control driver 620. The timing controller 210 may supply the scan control signal SCS to the scan driver 610 through a first scan control line SCL1. The timing controller 210 may supply the emission control signal ECS to the emission control driver 620 through the second scan control line SCL2. The timing controller 210 may supply the digital video data DATA and the data control signal DCS to the data driver 220.

The data driver 220 may convert the digital video data DATA into analog data voltages and supply them to the data lines DL through the fan-out lines FL. The gate signals of the scan driver 610 may select pixels SP to which the data voltage is supplied, and the selected pixels SP may receive the data voltages through the data lines DL. The data driver 220 may supply a sensing signal received through the read-out line ROL to the main processor.

The power supply unit 500 may be disposed on the circuit board 300 to supply a power voltage to the display driver 200 and the display panel 100. The power supply unit 500 may generate a power voltage to supply it to the power lines VL, and generate a common voltage to supply it to the common electrode that is common to the pixels SP and the fingerprint sensors OPD. The power supply unit 500 may generate an initialization voltage to supply it to an initialization voltage line, generate a reference voltage to supply it to a reference voltage line, generate a bias voltage to supply it to a bias voltage line, and generate a reset voltage to supply it to a reset voltage line.

The scan driver 610 may be disposed at one external side of the display area DA or at one side of the non-display area NDA. The emission control driver 620 may be disposed at the other external side of the display area DA or at the other side of the non-display area NDA. However, the present disclosure is not limited thereto. As another example, the scan driver 610 and the emission control driver 620 may be disposed at any one of one side and the other side of the non-display area NDA.

The scan driver 610 may include a plurality of transistors that generate scan signals in response to the scan control signal SCS. The emission control driver 620 may include a plurality of transistors for generating emission signals in response to the emission control signal ECS. For example, the transistors of the scan driver 610 and the transistors of the emission control driver 620 may be formed in the same layer as the transistors of each of the pixels SP. The scan driver 610 may supply the scan signals to the scan lines SL and the emission control driver 620 may supply the emission signals to the emission control lines EML.

Figure 5:
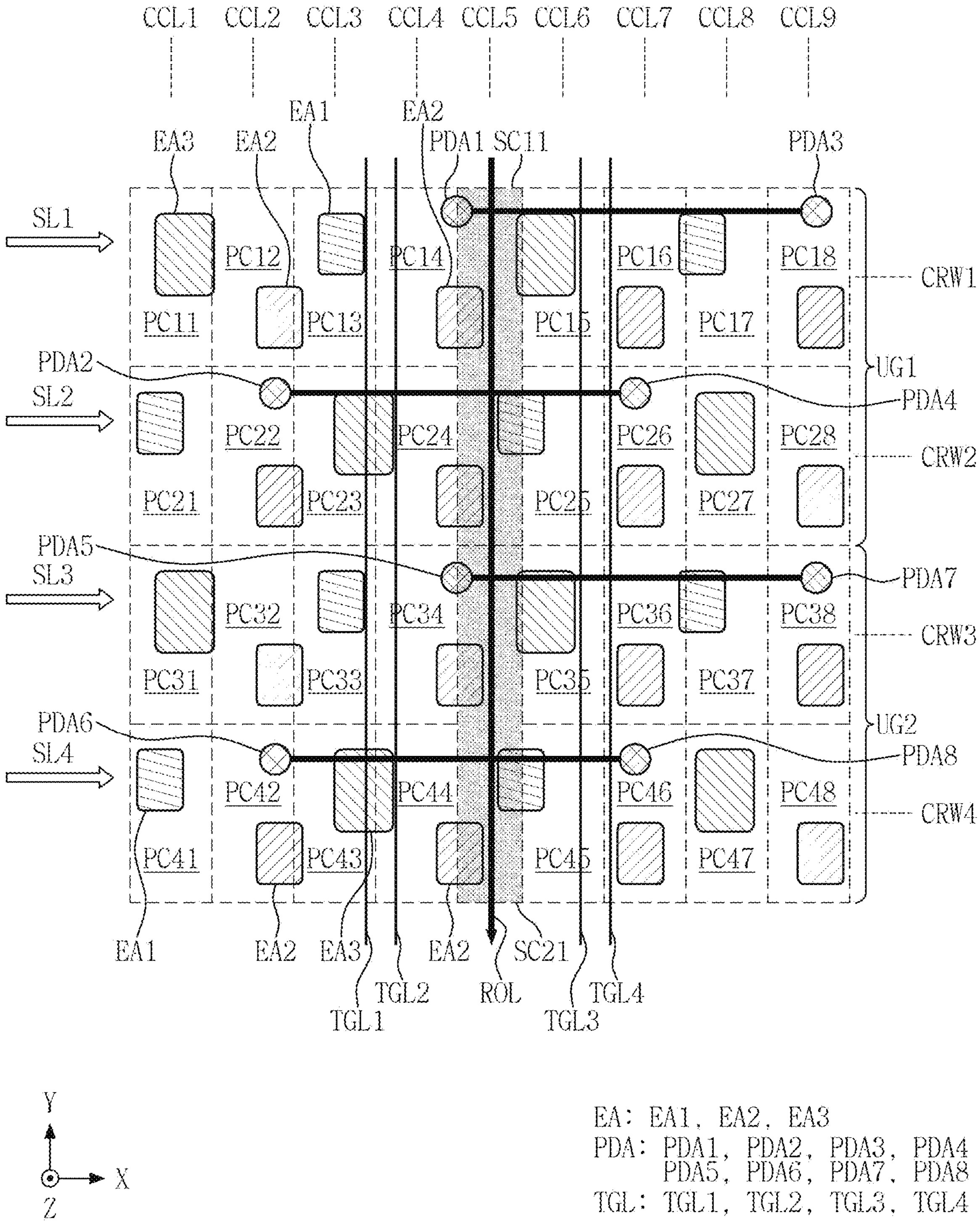
FIG. 5 is a plan view showing a pixel circuit and a sensor circuit of a display device according to one embodiment.

FIG. 5 is a plan view showing a pixel circuit and a sensor circuit of a display device according to one embodiment.

Referring to FIG. 5, a plurality of pixel circuits and a plurality of sensor circuits may be arranged along a plurality of rows and columns in the display area DA. For example, the pixel circuits and the sensor circuits may be arranged along first to fourth circuit rows CRW1, CRW2, CRW3, and CRW4 and first to ninth circuit columns CCL1, CCL2, CCL3, CCL4, CCL5, CCL6, CCL7, CCL8, and CCL9. Each of first to fourth scan lines SL1, SL2, SL3, and SL4 may supply a scan signal to the pixel SP and the fingerprint sensor OPD disposed in each of the first to fourth circuit rows CRW1, CRW2, CRW3, and CRW4. The pixel circuits and the sensor circuits may be disposed at a certain ratio in the display area DA. The display area DA includes the pixel circuits and the sensor circuits that are disposed at a certain ratio, and thus may include the pixels SP and the fingerprint sensors OPD that are disposed in the same layer. One pixel SP may include one light emitting element, and one fingerprint sensor OPD may include four light receiving elements. For example, the pixel circuits and the sensor circuits may be disposed at a ratio of 16:1, and the light emitting elements and light receiving elements may be disposed at a ratio of 4:1, but these ratios are not limited thereto. Accordingly, the display device 10 may improve the resolution of the pixels SP while maintaining the sensitivity of the fingerprint sensor OPD.

The pixels SP and the fingerprint sensors OPD disposed in the first and second circuit rows CRW1 and CRW2 and the first to ninth circuit columns CCL1, CCL2, CCL3, CCL4, CCL5, CCL6, CCL7, CCL8, and CCL9 may form a first unit group UG1. The first circuit row CRW1 may include eleventh to eighteenth pixel circuits PC11, PC12, PC13, PC14, PC15, PC16, PC17, and PC18 and an eleventh sensor circuit SC11. The second circuit row CRW2 may include twenty-first to twenty-eighth pixel circuits PC21, PC22, PC23, PC24, PC25, PC26, PC27, and PC28 and the eleventh sensor circuit SC11. Accordingly, the eleventh sensor circuit SC11 may be disposed across the first and second circuit rows CRW1 and CRW2. The eleventh sensor circuit SC11 may be disposed between the fourteenth and fifteenth pixel circuits PC14 and PC15, and between the twenty-fourth, and twenty-fifth pixel circuits PC24 and PC25. The eleventh sensor circuit SC11 may receive a first or second scan signal from the first or second scan line SL1 or SL2.

The eleventh pixel circuit PC11 may be disposed in an area corresponding to a third emission area EA3, the twelfth pixel circuit PC12 may be disposed in an area corresponding to a second emission area EA2, the thirteenth pixel circuit PC13 may be disposed in an area corresponding to a first emission area EA1, and the fourteenth pixel circuit PC14 may be disposed in an area corresponding to the second emission area EA2. One emission area EA may be an area corresponding to one pixel circuit and one light emitting element. One unit pixel may include one first emission area EA1, two second emission areas EA2, and one third emission area EA3 to express a white grayscale, but the configuration of the unit pixel is not limited thereto.

The read-out line ROL and first to fourth control lines TGL1, TGL2, TGL3, and TGL4 may extend in the Y-axis direction and be spaced apart from each other in the X-axis direction. The eleventh sensor circuit SC11 and a twenty-first sensor circuit SC21 may be connected to one read-out line ROL. One fingerprint sensor OPD may include the eleventh sensor circuit SC11 and first to fourth sensor areas PDA1, PDA2, PDA3, and PDA4. The first and third sensor areas PDA1 and PDA3 may overlap the pixel circuits of the first circuit row CRW1. The second and fourth sensor areas PDA2 and PDA4 may overlap the pixel circuits of the second circuit row CRW2. One fingerprint sensor may include first to fourth light receiving elements, and the first to fourth light receiving elements may receive light through the first to fourth sensor areas PDA1, PDA2, PDA3, and PDA4, respectively. One of the first to fourth control lines TGL1, TGL2, TGL3, and TGL4 may supply a control signal to select one of the first to fourth light receiving elements, and the selected light receiving element may receive light to generate a sensing signal. Accordingly, the first unit group UG1 may include four unit pixels and one fingerprint sensor OPD. The first unit group UG1 may include sixteen pixel circuits and one sensor circuit, and may include sixteen light emitting elements and four light receiving elements. Accordingly, the display device 10 may maintain the sensitivity of the fingerprint sensor OPD in a high-resolution display product.

The pixels SP and the fingerprint sensors OPD disposed in the third and fourth circuit rows CRW3 and CRW4 and the first to ninth circuit columns CCL1, CCL2, CCL3, CCL4, CCL5, CCL6, CCL7, CCL8, and CCL9 may form a second unit group UG2. The third circuit row CRW3 may include thirty-first to thirty-eighth pixel circuits PC31, PC32, PC33, PC34, PC35, PC36, PC37, and PC38 and the twenty-first sensor circuit SC21. The fourth circuit row CRW4 may include forty-first to forty-eighth pixel circuits PC41, PC42, PC43, PC44, PC45, PC46, PC47, and PC48 and the twenty-first sensor circuit SC21. Accordingly, the twenty-first sensor circuit SC21 may be disposed across the third and fourth circuit rows CRW3 and CRW4. The twenty-first sensor circuit SC21 may be disposed between the thirty-fourth and thirty-fifth pixel circuits PC34 and PC35, and between the forty-fourth and forty-fifth pixel circuits 44, and PC45. The twenty-first sensor circuit SC21 may receive the third or fourth scan signal from the third or fourth scan line SL3 or SLA.

The fingerprint sensor OPD of the second unit group UG2 may include the twenty-first sensor circuit SC21 and fifth to eighth sensor areas PDA5, PDA6, PDA7, and PDA8. The fifth and seventh sensor areas PDA5 and PDA7 may overlap the pixel circuits of the third circuit row CRW3. The sixth and eighth sensor areas PDA6 and PDA8 may overlap the pixel circuits of the fourth circuit row CRW4. The fingerprint sensor OPD of the second unit group UG2 may include fifth to eighth light receiving elements, and the fifth to eighth light receiving elements may receive light through the fifth to eighth sensor areas PDA5, PDA6, PDA7, and PDA8, respectively. Accordingly, the second unit group UG2 may include four unit pixels and one fingerprint sensor OPD.

Figure 6:
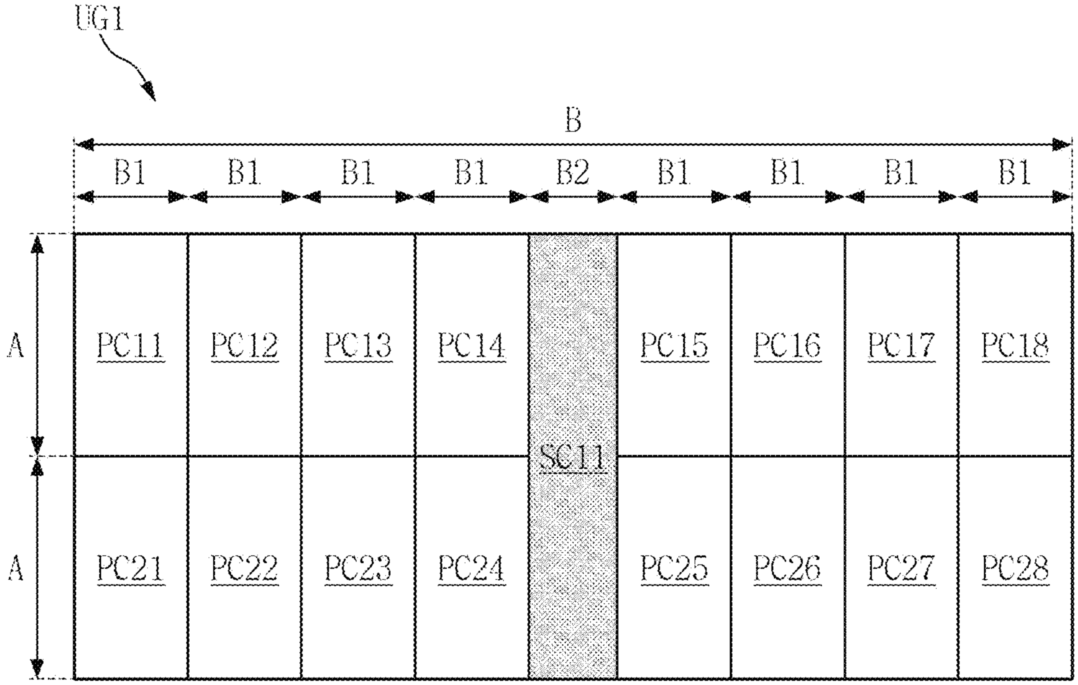
FIG. 6 is a plan view of a pixel circuit and a sensor circuit that are disposed in a unit group in a display device according to one embodiment.

FIG. 6 is a plan view of a pixel circuit and a sensor circuit that are disposed in a unit group in a display device according to one embodiment.

Referring to FIG. 6, the pixel circuits and the sensor circuits may be disposed at a constant ratio in the display area DA. The pixel circuits may have the same size, and the sensor circuits may have the same size. The pixel circuits and the sensor circuits may be disposed at a ratio of 16:1. For example, the first unit group UG1 may include sixteen pixel circuits PC11, PC12, PC13, PC14, PC15, PC16, PC17, PC18, PC21, PC22, PC23, PC24, PC25, PC26, PC27, and PC28 and one sensor circuit SC11.

For example, when the Y-axis length of the first unit group UG1 is "2A," the Y-axis length of one pixel circuit may be "A," and the Y-axis length of the eleventh sensor circuit SC11 may be "2A." If the X-axis direction length of the first unit group UG1 is "B," the X-axis direction length of the eleventh pixel circuit PC11 is "B1," and the X-axis direction length of the eleventh sensor circuit SC11 is "B2," "B=8×B1+B2" may be satisfied. When the area of the first unit group UG1 is fixed, the number of pixel circuits may increase as the number of sensor circuits decreases, and the number of pixel circuits may decrease as the number of sensor circuits increases. Accordingly, by including the pixel circuits and the sensor circuits disposed at a certain ratio, the display device 10 may maintain the sensitivity of the fingerprint sensor OPD in a high-resolution display product without adding a mask process.

Figure 7:
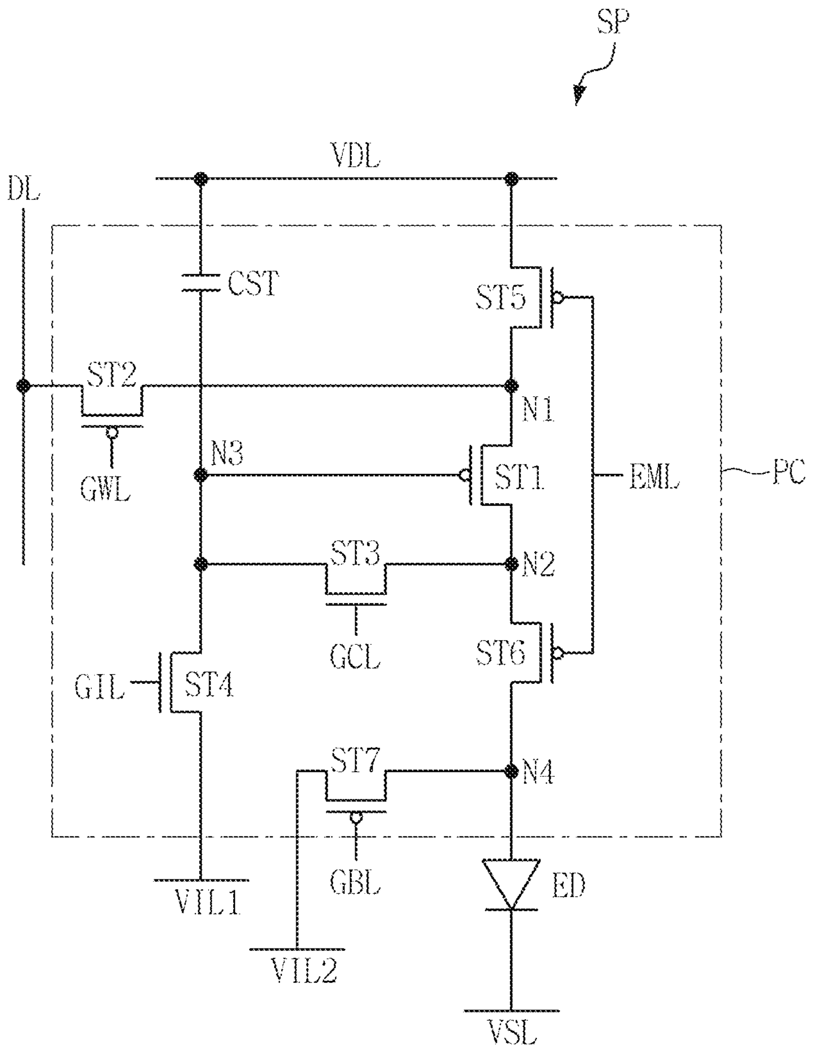
FIG. 7 is a circuit diagram illustrating a pixel of a display device according to one embodiment.

FIG. 7 is a circuit diagram illustrating a pixel of a display device according to one embodiment.

Referring to FIG. 7, the pixel SP may be connected to a first gate line GWL, a second gate line GCL, a third gate line GIL, a fourth gate line GBL, the emission control line EML, the data line DL, the driving voltage line VDL, a first initialization voltage line VIL1, a second initialization voltage line VIL2, and a low potential line VSL. In conjunction with FIG. 5, each of the first to fourth scan lines SL1, SL2, SL3, and SL4 may include the first gate line GWL, the second gate line GCL, the third gate line GIL, the fourth gate line GBL, and the emission control line EML.

The pixel SP may include a light emitting element ED and a pixel circuit PC for driving the light emitting element ED. The pixel circuit PC may include the first to seventh transistors ST1, ST2, ST3, ST4, ST5, ST6, and ST7 and the storage capacitor CST.

The first transistor ST1 may control a driving current supplied to the light emitting element ED. The first transistor ST1 may include a gate electrode, a first electrode, and a second electrode. The gate electrode of the first transistor ST1 may be connected to a third node N3, the first electrode thereof may be connected to a first node N1, and the second electrode thereof may be connected to a second node N2. For example, the first electrode of the first transistor ST1 may be a source electrode and the second electrode thereof may be a drain electrode, but the present disclosure is not limited thereto.

The first transistor ST1 may control a source-drain current Isd (hereinafter, referred to as "driving current") according to the data voltage applied to the gate electrode. The driving current Isd flowing through the channel of the first transistor ST1 may be proportional to the square of a difference between a threshold voltage Vth and a voltage Vgs between the gate electrode and the source electrode of the first transistor ST1 ($Isd=k\times(Vgs-Vth)^2$). Here, k is a proportional coefficient determined by the structure and physical characteristics of the first transistor ST1, Vgs is a gate-source voltage of the first transistor ST1, and Vth is a threshold voltage of the first transistor ST1.

The light emitting element ED may emit light by receiving the driving current Isd. The emission amount or the luminance of the light emitting element ED may be proportional to the magnitude of the driving current Isd. The light emitting element ED may include a first electrode, a second electrode, and a light emitting layer disposed between the first electrode and the second electrode. The first electrode of the light emitting element ED may be connected to a fourth node N4. The first electrode of the light emitting element ED may be electrically connected to the second electrode of the sixth transistor ST6 and the first electrode of the seventh transistor ST7 through the fourth node N4. The second electrode of the light emitting element ED may be connected to a low potential line VSSL. For example, the first electrode of the light emitting element ED may be an anode electrode or a pixel electrode, and the second electrode thereof may be a cathode electrode or a common electrode, but the present disclosure is not limited thereto.

The second transistor ST2 may be turned on by the first gate signal of the first gate line GWL to electrically connect the data line DL to the first node N1 which is the first electrode of the first transistor ST1. The second transistor ST2 may be turned on in response to the first gate signal to supply the data voltage to the first node N1. The gate electrode of the second transistor ST2 may be connected to the first gate line GWL, the first electrode thereof may be connected to the data line DL, and the second electrode thereof may be connected to the first node N1. The second electrode of the second transistor ST2 may be electrically connected to the first electrode of the first transistor ST1 and the second electrode of the fifth transistor ST5 through the first node N1. For example, the first electrode of the second transistor ST2 may be a source electrode and the second electrode thereof may be a drain electrode, but the present disclosure is not limited thereto.

The third transistor ST3 may be turned on in response to the second gate signal of the second gate line GCL to electrically connect the second node N2, which is the second electrode of the first transistor ST1, to the third node N3, which is the gate electrode the first transistor ST1. The gate electrode of the third transistor ST3 may be connected to the second gate line GCL, the first electrode thereof may be connected to the second node N2, and the second electrode thereof may be connected to the third node N3. The first electrode of the third transistor ST3 may be electrically connected to the second electrode of the first transistor ST1 and the first electrode of the sixth transistor ST6 through the second node N2. The second electrode of the third transistor ST3 may be electrically connected to the gate electrode of the first transistor ST1, the first electrode of the fourth transistor ST4, and a first capacitor electrode of the storage capacitor CST through the third node N3. For example, the first electrode of the third transistor ST3 may be a drain electrode and the second electrode thereof may be a source electrode, but the configuration of the third transistor ST3 is not limited thereto.

The fourth transistor ST4 may be turned on in response to a third gate signal of the third gate line GIL to electrically connect the third node N3, which is the gate electrode of the first transistor ST1, to the first initialization voltage line VIL1. The fourth transistor ST4 may be turned on in response to the third gate signal, thereby discharging the gate electrode of the first transistor ST1 to a first initialization voltage. The gate electrode of the fourth transistor ST4 may be connected to the third gate line GIL, the first electrode thereof may be connected to the third node N3, and the second electrode thereof may be connected to the first initialization voltage line VIL1. The first electrode of the fourth transistor ST4 may be electrically connected to the gate electrode of the first transistor ST1, the second electrode of the third transistor ST3, and a first capacitor electrode of the storage capacitor CST through the third node N3. For example, the first electrode of the fourth transistor ST4 may be a drain electrode and the second electrode thereof may be a source electrode, but the configuration of the fourth transistor ST4 is not limited thereto.

The fifth transistor ST5 may be turned on in response to an emission signal of the emission control line EML to electrically connect the driving voltage line VDL with the first node N1 that is the first electrode of the first transistor ST1. The gate electrode of the fifth transistor ST5 may be connected to the emission control line EML, the first electrode thereof may be connected to the driving voltage line VDL, and the second electrode thereof may be connected to the first node N1. The second electrode of the fifth transistor ST5 may be electrically connected to the first electrode of the first transistor ST1 and the second electrode of the second transistor ST2 through the first node N1. For example, the first electrode of the fifth transistor ST5 may be a source electrode and the second electrode thereof may be a drain electrode, but the present disclosure is not limited thereto.

The sixth transistor ST6 may be turned on in response to the emission signal of the emission control line EML to electrically connect the second node N2 that is the second electrode of the first transistor ST1 with the fourth node N4 that is the first electrode of the light emitting element ED. The gate electrode of the sixth transistor ST6 may be connected to the emission control line EML, the first electrode thereof may be connected to the second node N2, and the second electrode thereof may be connected to the fourth node N4. The first electrode of the sixth transistor ST6 may be electrically connected to the second electrode of the first transistor ST1 and the first electrode of the third transistor ST3 through the second node N2. The second electrode of the sixth transistor ST6 may be electrically connected to the first electrode of the light emitting element ED and the first electrode of the seventh transistor ST7 through the fourth node N4. For example, the first electrode of the sixth transistor ST6 may be a source electrode and the second electrode thereof may be a drain electrode, but the present disclosure is not limited thereto.

When all of the fifth transistor ST5, the first transistor ST1, and the sixth transistor ST6 are turned on, the driving current Isd may be supplied to the plurality of light emitting elements ED.

The seventh transistor ST7 may be turned on in response to a fourth gate signal of the fourth gate line GBL to electrically connect the fourth node N4 that is the first electrode of the light emitting element ED with the second initialization voltage line VIL2. When the seventh transistor ST7 is turned-on in response to the fourth gate signal, the first electrode of the light emitting element ED may be discharged to a second initialization voltage. The gate electrode of the seventh transistor ST7 may be connected to the fourth gate line GBL, the first electrode thereof may be connected to the fourth node N4, and the second electrode thereof may be connected to the second initialization voltage line VIL2. The first electrode of the seventh transistor ST7 may be electrically connected to the first electrode of the light emitting element ED and the second electrode of the seventh transistor ST6 through the fourth node N4.

Each of the first transistor ST1, the second transistor ST2, the fifth transistor ST5, the sixth transistor ST6, and the seventh transistor ST7 may include a silicon-based semiconductor region. For example, each of the first transistor ST1, the second transistor ST2, the fifth transistor ST5, the sixth transistor ST6, and the seventh transistor ST7 may include a semiconductor region made of low temperature polycrystalline silicon (LTPS). The semiconductor region made of low temperature polycrystalline silicon may have high electron mobility and excellent turn-on characteristics. Accordingly, since the display device includes the first transistor ST1, the second transistor ST2, the fifth transistor ST5, the sixth transistor ST6, and the seventh transistor ST7 having excellent turn-on characteristics, a plurality of pixels SP can be driven stably and efficiently.

Each of the first transistor ST1, the second transistor ST2, the fifth transistor ST5, the sixth transistor ST6, and the seventh transistor ST7 may correspond to a p-type transistor. For example, each of the first transistor ST1, the second transistor ST2, the fifth transistor ST5, the sixth transistor ST6, and the seventh transistor ST7 may output a current flowing into the first electrode to the second electrode in response to a gate low voltage applied to the gate electrode.

Each of the third transistor ST3 and the fourth transistor ST4 may include an oxide-based semiconductor region. For example, each of the third transistor ST3 and the fourth transistor ST4 may have a coplanar structure in which the gate electrode is disposed on the oxide-based semiconductor region. The transistor having the coplanar structure may have excellent leakage current characteristics and perform low frequency driving, thereby reducing power consumption. Accordingly, the display device may include the third transistor ST3 and the fourth transistor ST4 having excellent leakage current characteristics, thereby preventing a leakage current from flowing in the pixel, and stably maintaining the voltage in the pixel.

Each of the third transistor ST3 and the fourth transistor ST4 may correspond to an n-type transistor. For example, each of the third transistor ST3 and the fourth transistor ST4 may output a current flowing into the first electrode to the second electrode in response to a gate high voltage applied to the gate electrode.

The storage capacitor CST may be connected between the third node N3, which is the gate electrode of the first transistor ST1, and the driving voltage line VDL. For example, the first capacitor electrode of the storage capacitor CST may be connected to the third node N3, and the second capacitor electrode of the storage capacitor CST may be connected to the driving voltage line VDL, thereby maintaining a potential difference between the driving voltage line VDL and the gate electrode of the first transistor ST1.

Figure 8:
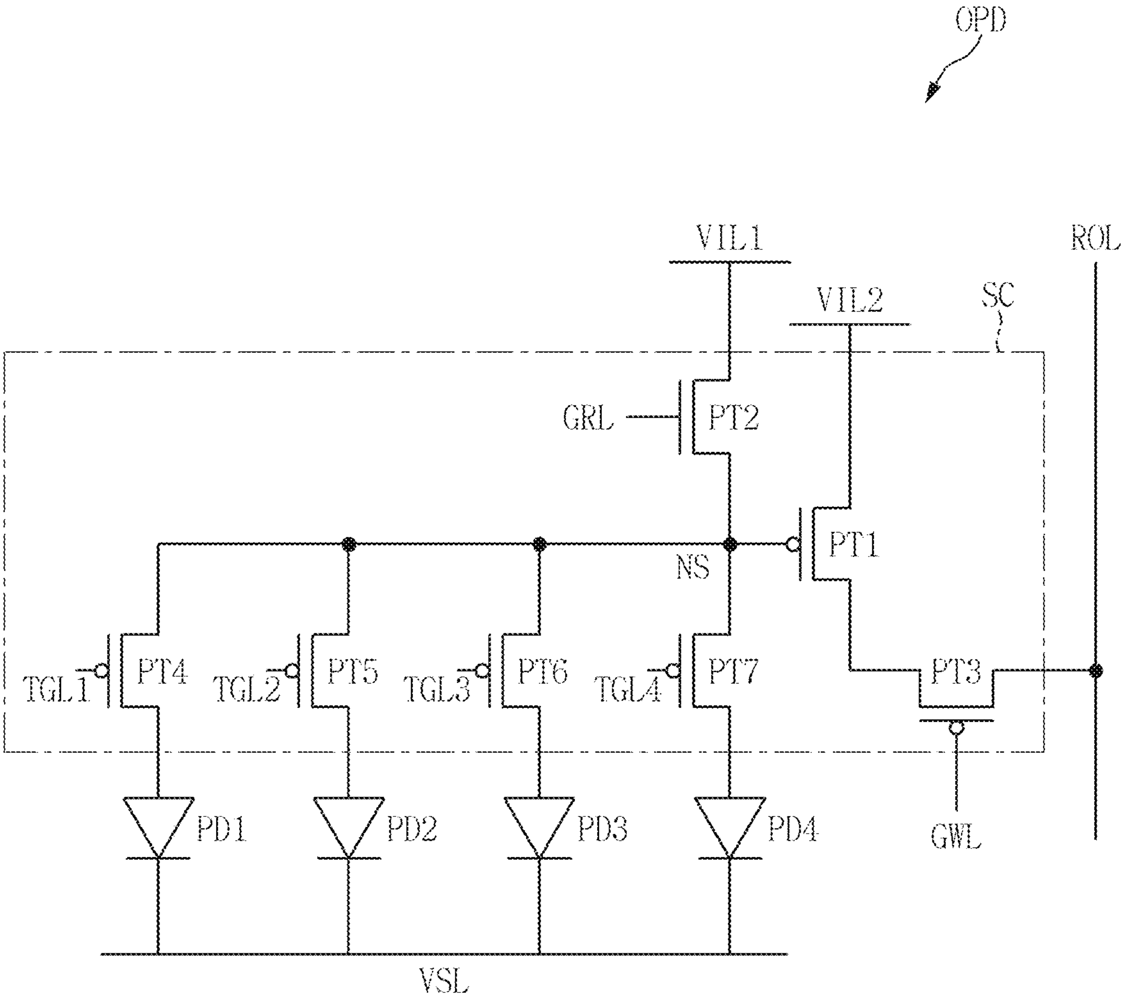
FIG. 8 is a circuit diagram of a fingerprint sensor of a display device according to one embodiment.

FIG. 8 is a circuit diagram of a fingerprint sensor of a display device according to one embodiment.

Referring to FIG. 8, the fingerprint sensor OPD may be connected to the first gate line GWL, the reset signal line GRL, the first initialization voltage line VIL1, the second initialization voltage line VIL2, the first to fourth control lines TGL1, TGL2, TGL3, and TGL4, and the read-out line ROL.

The fingerprint sensor OPD may include first to fourth light receiving elements PD1, PD2, PD3, and PD4 and a sensor circuit SC for driving the first to fourth light receiving elements PD1, PD2, PD3, and PD4. The sensor circuit SC may include first to seventh sensor transistors PT1, PT2, PT3, PT4, PT5, PT6, and PT7.

The first sensor transistor PT1 may include a gate electrode, a first electrode, and a second electrode. The gate electrode of the first sensor transistor PT1 may be connected to a sensor node NS, the first electrode thereof may be connected to the third sensor transistor PT3, and the second electrode thereof may be connected to the second initialization voltage line VIL2. The first sensor transistor PT1 may control a source-drain current Isd (hereinafter referred to as "sensing current") based on the voltage of the sensor node NS which is connected to the first electrodes of the light receiving elements PD1, PD2, PD3 and PD4 through a fourth sensor transistor PT4, a fifth sensor transistor PT5, a sixth sensor transistor PT6, and a seventh sensor transistor PT7, respectively. The sensing current Isd flowing through the channel of the first sensor transistor PT1 may be proportional to the square of a difference between a threshold voltage Vth and a voltage Vgs between the gate electrode and the source electrode of the first sensor transistor PT1 ($Isd=k'\times(Vgs-Vth)^2$). Here, k' is a proportional coefficient determined by the structure and physical characteristics of the first sensor transistor PT1, Vgs is a gate-source voltage of the first sensor transistor PT1, and Vth is a threshold voltage of the first sensor transistor PT1. The first electrode of the first sensor transistor PT1 may be a source electrode and the second electrode thereof may be a drain electrode, but the present disclosure is not limited thereto.

The second sensor transistor PT2 may be turned on in response to the reset signal of the reset signal line GRL, thereby discharging the sensor node NS to the first initialization voltage. The gate electrode of the second sensor transistor PT2 may be connected to the reset signal line GRL, the first electrode thereof may be connected to the sensor node NS, and the second electrode thereof may be connected to the first initialization voltage line VIL1. The first electrode of the second sensor transistor PT2 may be electrically connected, through the sensor node NS, to the gate electrode of the first sensor transistor PT1 and to the second electrode of each of the fourth to seventh sensor transistors PT4, PT5, PT6, and PT7. The first electrode of the second sensor transistor PT2 may be a drain electrode and the second electrode thereof may be a source electrode, but the present disclosure is not limited thereto.

The third sensor transistor PT3 may be turned on in response to the first gate signal of the first gate line GWL to electrically connect the first electrode of the first sensor transistor PT1 to the read-out line ROL. The gate electrode of the third sensor transistor PT3 may be connected to the first gate line GWL, the first electrode thereof may be connected to the read-out line ROL, and the second electrode thereof may be connected to the first electrode of the first sensor transistor PT1. The first electrode of the third sensor transistor PT3 may be a source electrode and the second electrode thereof may be a drain electrode, but the present disclosure is not limited thereto.

The fourth sensor transistor PT4 may be turned on in response to a first control signal of the first control line TGL1 to electrically connect the first electrode of the first light receiving element PD1 to the sensor node NS. The gate electrode of the fourth sensor transistor PT4 may be connected to the first control line TGL1, the first electrode thereof may be connected to the first electrode of the first light receiving element PD1, and the second electrode thereof may be connected to the sensor node NS. The first electrode of the fourth sensor transistor PT4 may be a source electrode and the second electrode thereof may be a drain electrode, but the present disclosure is not limited thereto. The second electrode of the first light receiving element PD1 may be connected to the low potential line VSL.

The fifth sensor transistor PT5 may be turned on in response to a second control signal of the second control line TGL2 to electrically connect the first electrode of the second light receiving element PD2 to the sensor node NS. The gate electrode of the fifth sensor transistor PT5 may be connected to the second control line TGL2, the first electrode thereof may be connected to the first electrode of the second light receiving element PD2, and the second electrode thereof may be connected to the sensor node NS. The first electrode of the fifth sensor transistor PT5 may be a source electrode and the second electrode thereof may be a drain electrode, but the present disclosure is not limited thereto. The second electrode of the second light receiving element PD2 may be connected to the low potential line VSL.

The sixth sensor transistor PT6 may be turned on in response to a third control signal of the third control line TGL3 to electrically connect the first electrode of the third light receiving element PD3 to the sensor node NS. The gate electrode of the sixth sensor transistor PT6 may be connected to the third control line TGL3, the first electrode thereof may be connected to the first electrode of the third light receiving element PD3, and the second electrode thereof may be connected to the sensor node NS. The first electrode of the sixth sensor transistor PT6 may be a source electrode and the second electrode thereof may be a drain electrode, but the present disclosure is not limited thereto. The second electrode of the third light receiving element PD3 may be connected to the low potential line VSL.

The seventh sensor transistor PT7 may be turned on in response to a fourth control signal of the fourth control line TGL4 to electrically connect the first electrode of the fourth light receiving element PD4 to the sensor node NS. The gate electrode of the seventh sensor transistor PT7 may be connected to the fourth control line TGL4, the first electrode thereof may be connected to the first electrode of the fourth light receiving element PD4, and the second electrode thereof may be connected to the sensor node NS. The first electrode of the seventh sensor transistor PT7 may be a source electrode and the second electrode thereof may be a drain electrode, but the present disclosure is not limited thereto. The second electrode of the fourth light receiving element PD4 may be connected to the low potential line VSL.

The first, and third to seventh sensor transistors PT1, PT3, PT4, PT5, PT6, and PT7 may include a silicon-based semiconductor. The first, and third to seventh sensor transistors PT1, PT3, PT4, PT5, PT6, and PT7 may include a semiconductor region made of low temperature polycrystalline silicon (LTPS). The first, and third to seventh sensor transistors PT1, PT3, PT4, PT5, PT6, and PT7 may correspond to p-type transistors.

The second sensor transistor PT2 may include an oxide-based semiconductor. The second sensor transistor PT2 may have a coplanar structure in which the gate electrode is disposed on the oxide-based semiconductor region. The second sensor transistor PT2 may correspond to an n-type transistor.

The light receiving element PD may recognize the pattern of the user's fingerprint based on light reflected from the user's finger. When the user's finger touches the display panel 100, the light receiving element PD may receive light reflected by the ridges and/or valleys of the finger. The light output from the light emitting element ED may be reflected by the ridges and/or valleys of the finger, and the reflected light may reach the light receiving element PD. The light receiving element PD may convert the energy of light into an electrical signal (current or voltage) formed between the first and second electrodes of the light receiving element PD, and the converted electrical signal may flow from the light receiving element PD to the sensor node NS as a reverse bias current. For example, when the light receiving element PD receives light and an electric field is formed between the first and second electrodes of the light receiving element PD, a current may flow through the light receiving element PD in proportion to the amount of light and the voltage at the sensor node NS may increase. Accordingly, when the light receiving element PD receives light, the voltage of the sensor node NS may increase and the magnitude of a sensing current (or source-drain current) of the first sensor transistor PT1 may decrease. The sensing current of the first sensor transistor PT1 may be applied to the display driver 200 as a sensing signal through the third sensor transistor PT3 and the read-out line ROL. The fourth to seventh sensor transistors PT4, PT5, PT6, and PT7 may control the sensing timing of the first to fourth light receiving elements PD1, PD2, PD3, and PD4. Accordingly, the display device 10 may drive the plurality of light receiving elements PD by using one sensor circuit SC, thereby relatively reducing the number of sensor circuits SC and maintaining the sensitivity of the fingerprint sensor OPD in a high-resolution display product.

Figure 9:
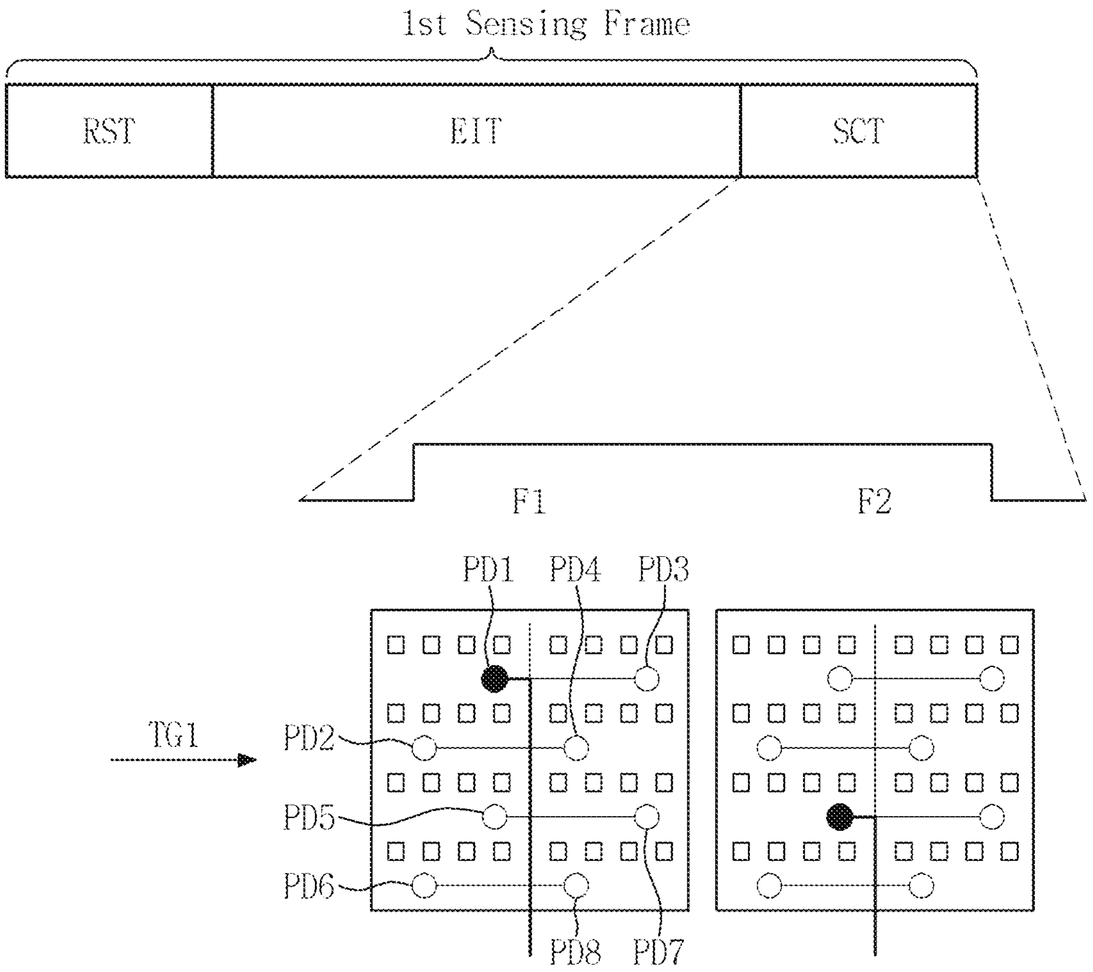
FIG. 9 is a diagram illustrating an operation of a first sensing frame in a display device according to one embodiment.

FIG. 9 is a diagram illustrating an operation of a first sensing frame in a display device according to one embodiment.

Referring to FIG. 9, a first sensing frame (1st Sensing Frame) may include a reset period RST, a hold period EIT, and a sensing period SCT.

Referring to FIG. 9 in conjunction with FIGS. 5 and 8, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The first light receiving element PD1 and a fifth light receiving element PD5 may receive reflected light during the hold period EIT. The first and fifth light receiving elements PD1 and PD5 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of the first sensing frame (1st Sensing Frame). The fourth sensor transistor PT4 of the eleventh sensor circuit SC11 may receive a first control signal TG1 from the first control line TGL1 during the first frame period F1. When the first light receiving element PD1 receives light during the first sensing frame (1st Sensing Frame), an electric field may be formed between the first and second electrodes of the first light receiving element PD1, and a current may flow through the first light receiving element PD1 in proportion to the amount of light, thereby increasing the voltage of the sensor node NS. Accordingly, when the first light receiving element PD1 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the first light receiving element PD1 may be supplied to the display driver 200 through the read-out line ROL during the first frame period F1 of the first sensing frame (1st Sensing Frame).

The twenty-first sensor circuit SC21 may be driven during the second frame period F2 of the first sensing frame (1st Sensing Frame). The fourth sensor transistor PT4 of the twenty-first sensor circuit SC21 may receive the first control signal TG1 from the first control line TGL1 during the second frame period F2. When the fifth light receiving element PD5 receives light during the first sensing frame (1st Sensing Frame), an electric field may be formed between the first and second electrodes of the fifth light receiving element PD5, and a current may flow through the fifth light receiving element PD5 in proportion to the amount of light, thereby increasing the voltage of the sensor node NS. Accordingly, when the fifth light receiving element PD5 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the fifth light receiving element PD5 may be supplied to the display driver 200 through the read-out line ROL during the second frame period F2 of the first sensing frame (1st Sensing Frame).

Figure 10:
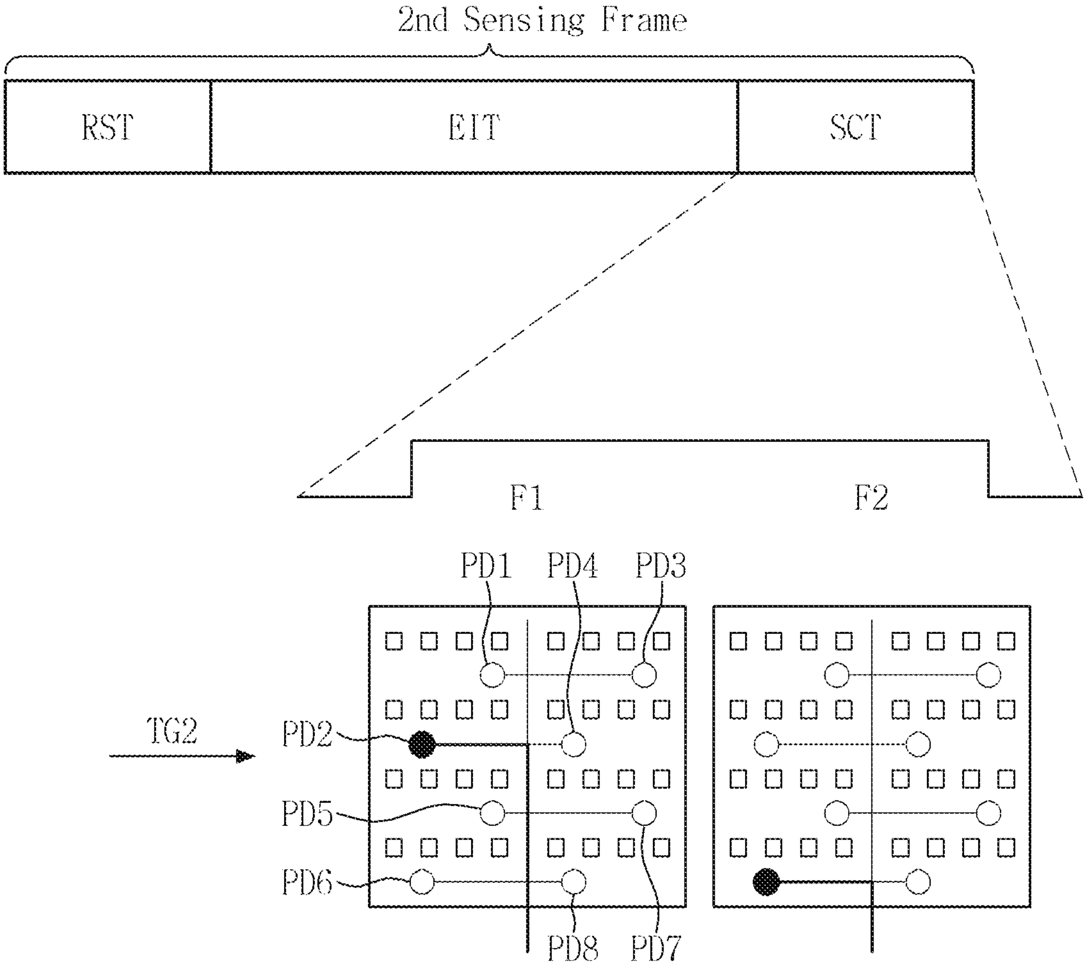
FIG. 10 is a diagram illustrating an operation of a second sensing frame in a display device according to one embodiment.

FIG. 10 is a diagram illustrating an operation of a second sensing frame in a display device according to one embodiment.

Referring to FIG. 10, a second sensing frame (2nd Sensing Frame) may include a reset period RST, a hold period EIT, and a sensing period SCT.

Referring to FIG. 10 in conjunction with FIGS. 5 and 8, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The second light receiving element PD2 and a sixth light receiving element PD6 may receive reflected light during the hold period EIT. The second and sixth light receiving elements PD2 and PD6 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of a second sensing frame (2nd Sensing Frame). The fifth sensor transistor PT5 of the eleventh sensor circuit SC11 may receive a second control signal TG2 from the second control line TGL2 during the first frame period F1. When the second light receiving element PD2 receives light during the second sensing frame (2nd Sensing Frame), an electric field may be formed between the first and second electrodes of the second light receiving element PD2, and a current may flow through the second light receiving element PD2 in proportion to the amount of light, thereby increasing the voltage of the sensor node NS. Accordingly, when the second light receiving element PD2 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the second light receiving element PD2 may be supplied to the display driver 200 through the read-out line ROL during the first frame period F1 of the second sensing frame (2nd Sensing Frame).

The twenty-first sensor circuit SC21 may be driven during the second frame period F2 of the second sensing frame (2nd Sensing Frame). The fifth sensor transistor PT5 of the twenty-first sensor circuit SC21 may receive the second control signal TG2 from the second control line TGL2 during the second frame period F2. When the sixth light receiving element PD6 receives light during the second sensing frame (2nd Sensing Frame), an electric field may be formed between the first and second electrodes of the sixth light receiving element PD6, and a current may flow through the sixth light receiving element PD6 in proportion to the amount of light, thereby increasing the voltage of the sensor node NS. Accordingly, when the sixth light receiving element PD6 receives light, the voltage of the sensor node NS may increase, and the magnitude of a sensing current (or source-drain current) of the first sensor transistor PT1 may decrease. The first and third sensor transistors PT1 and PT3 may be turned on during the sensing period SCT. The sensing signal from the sixth light receiving element PD6 may be supplied to the display driver 200 through the read-out line ROL during the second frame period F2 of the second sensing frame (2nd Sensing Frame).

Figure 11:
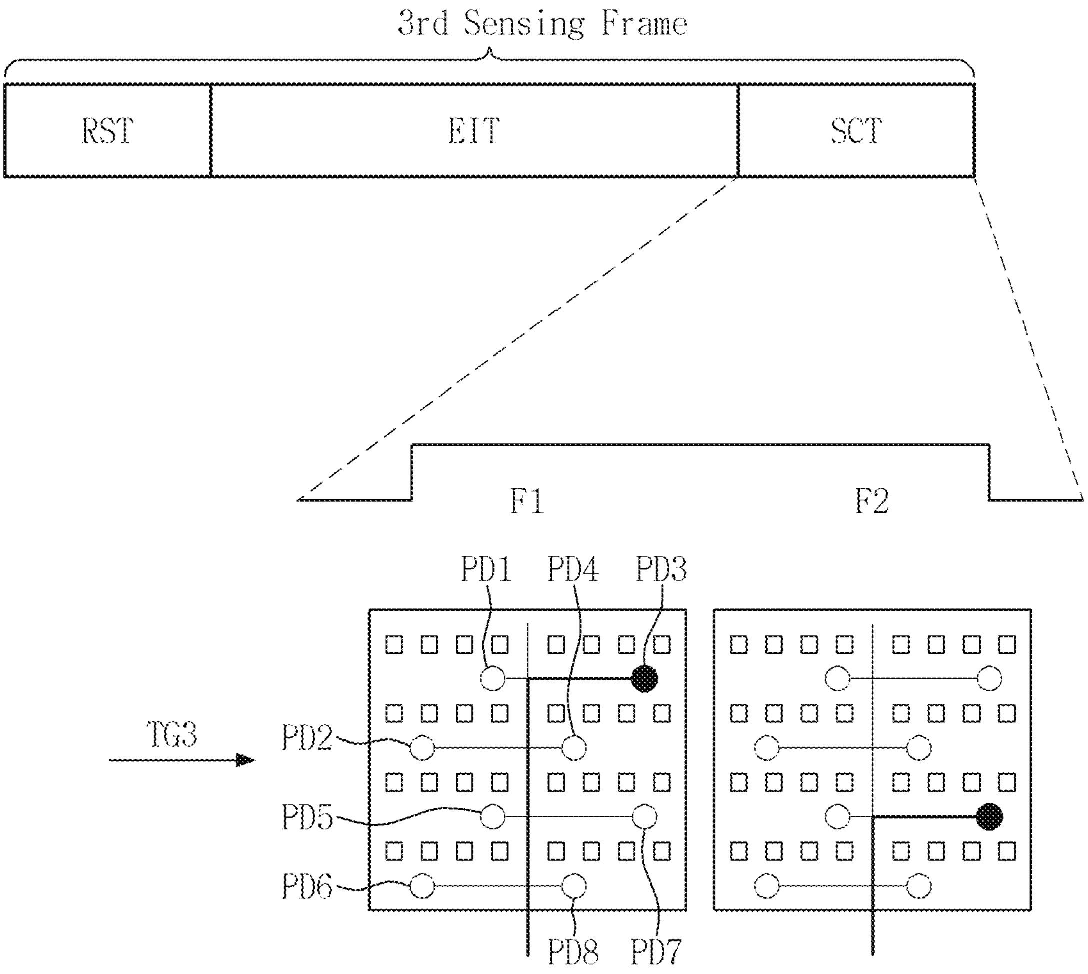
FIG. 11 is a diagram illustrating an operation of a third sensing frame in a display device according to one embodiment.

FIG. 11 is a diagram illustrating an operation of a third sensing frame in a display device according to one embodiment.

Referring to FIG. 11, a third sensing frame (3rd Sensing Frame) may include a reset period RST, a hold period EIT, and a sensing period SCT.

Referring to FIG. 11 in conjunction with FIGS. 5 and 8, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The third light receiving element PD3 and a seventh light receiving element PD7 may receive reflected light during the hold period EIT. The third and seventh light receiving elements PD3 and PD7 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of a third sensing frame (3rd Sensing Frame). The sixth sensor transistor PT6 of the eleventh sensor circuit SC11 may receive a third control signal TG3 from the third control line TGL3 during the first frame period F1. When the third light receiving element PD3 receives light during the third sensing frame (3rd Sensing Frame), an electric field may be formed between the first and second electrodes of the third light receiving element PD3, and a current may flow through the third light receiving element PD3 in proportion to the amount of light, thereby increasing the voltage of the sensor node NS. Accordingly, when the third light receiving element PD3 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the third light receiving element PD3 may be supplied to the display driver 200 through the read-out line ROL during the first frame period F1 of the third sensing frame (3rd Sensing Frame).

The twenty-first sensor circuit SC21 may be driven during the second frame period F2 of the third sensing frame (3rd Sensing Frame). The sixth sensor transistor PT6 of the twenty-first sensor circuit SC21 may receive the third control signal TG3 from the third control line TGL3 during the second frame period F2. When the seventh light receiving element PD7 receives light during the third sensing frame (3rd Sensing Frame), an electric field may be formed between the first and second electrodes of the seventh light receiving element PD7, and a current may flow through the seventh light receiving element PD7 in proportion to the amount of light, thereby increasing the voltage of the sensor node NS. Accordingly, when the seventh light receiving element PD7 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the seventh light receiving element PD7 may be supplied to the display driver 200 through the read-out line ROL during the second frame period F2 of the third sensing frame (3rd Sensing Frame).

Figure 12:
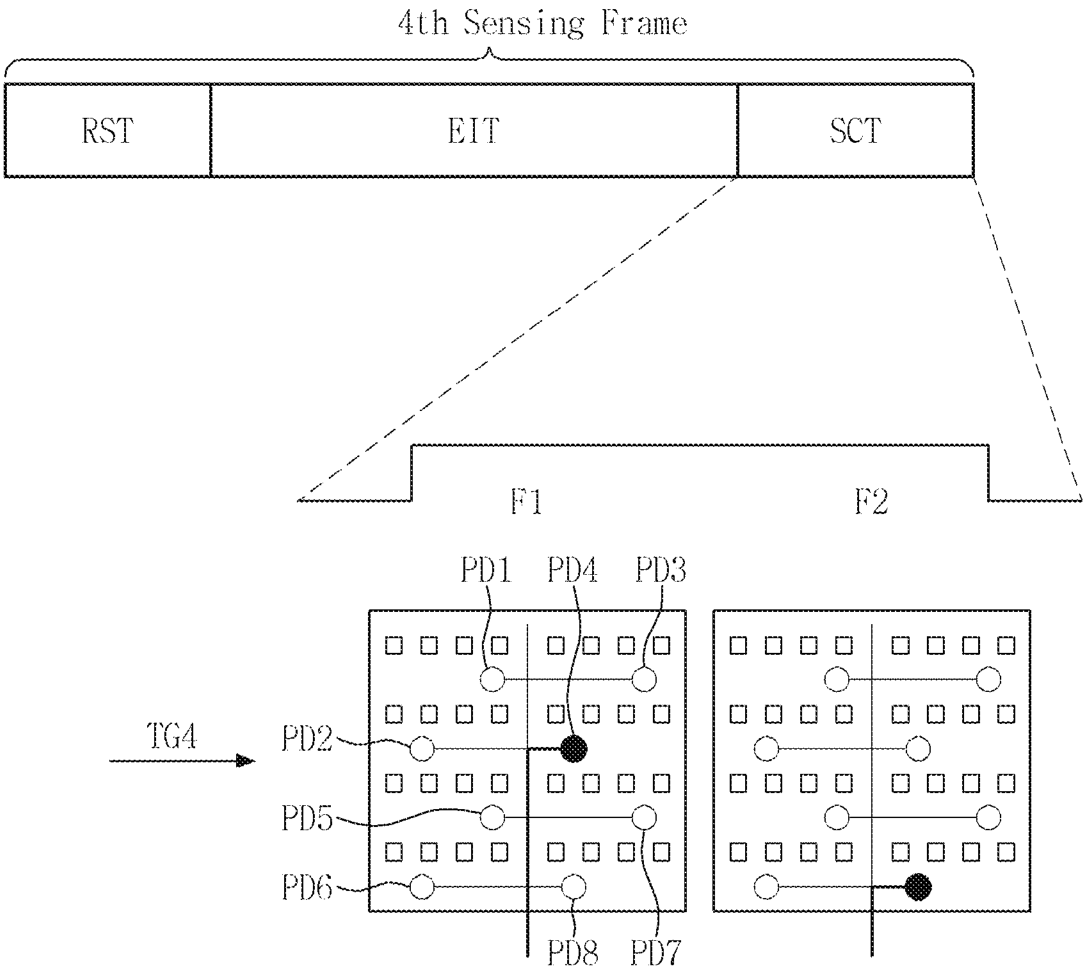
FIG. 12 is a diagram illustrating an operation of a fourth sensing frame in a display device according to one embodiment.

FIG. 12 is a diagram illustrating an operation of a fourth sensing frame in a display device according to one embodiment.

Referring to FIG. 12, a fourth sensing frame (4th Sensing Frame) may include a reset period RST, a hold period EIT, and a sensing period SCT.

Referring to FIG. 12 in conjunction with FIGS. 5 and 8, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The fourth light receiving element PD4 and an eighth light receiving element PD8 may receive reflected light during the hold period EIT. The fourth and eighth light receiving elements PD4 and PD8 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of a fourth sensing frame (4th Sensing Frame). The seventh sensor transistor PT7 of the eleventh sensor circuit SC11 may receive a fourth control signal TG4 from the fourth control line TGL4 during the first frame period F1. When the fourth light receiving element PD4 receives light during the fourth sensing frame (4th Sensing Frame), an electric field may be formed between the first and second electrodes of the fourth light receiving element PD4, and a current may flow through the fourth light receiving element PD4 in proportion to the amount of light, thereby increasing the voltage of the sensor node NS. Accordingly, when the fourth light receiving element PD4 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the fourth light receiving element PD4 may be supplied to the display driver 200 through the read-out line ROL during the first frame period F1 of the fourth sensing frame (4th Sensing Frame).

The twenty-first sensor circuit SC21 may be driven during the second frame period F2 of the fourth sensing frame (4th Sensing Frame). The seventh sensor transistor PT7 of the twenty-first sensor circuit SC21 may receive the fourth control signal TG4 from the fourth control line TGL4 during the second frame period F2. When the eighth light receiving element PD8 receives light during the fourth sensing frame (4th Sensing Frame), an electric field may be formed between the first and second electrodes of the eighth light receiving element PD8, and a current may flow through the eighth light receiving element PD8 in proportion to the amount of light, thereby increasing the voltage of the sensor node NS. Accordingly, when the eighth light receiving element PD8 receives light, the voltage of the sensor node NS may increase and the magnitude of a sensing current (or source-drain current) of the first sensor transistor PT1 may decrease. The first and third sensor transistors PT1 and PT3 may be turned on during the sensing period SCT. The sensing signal from the eighth light receiving element PD8 may be supplied to the display driver 200 through the read-out line ROL during the second frame period F2 of the fourth sensing frame (4th Sensing Frame).

Figure 13:
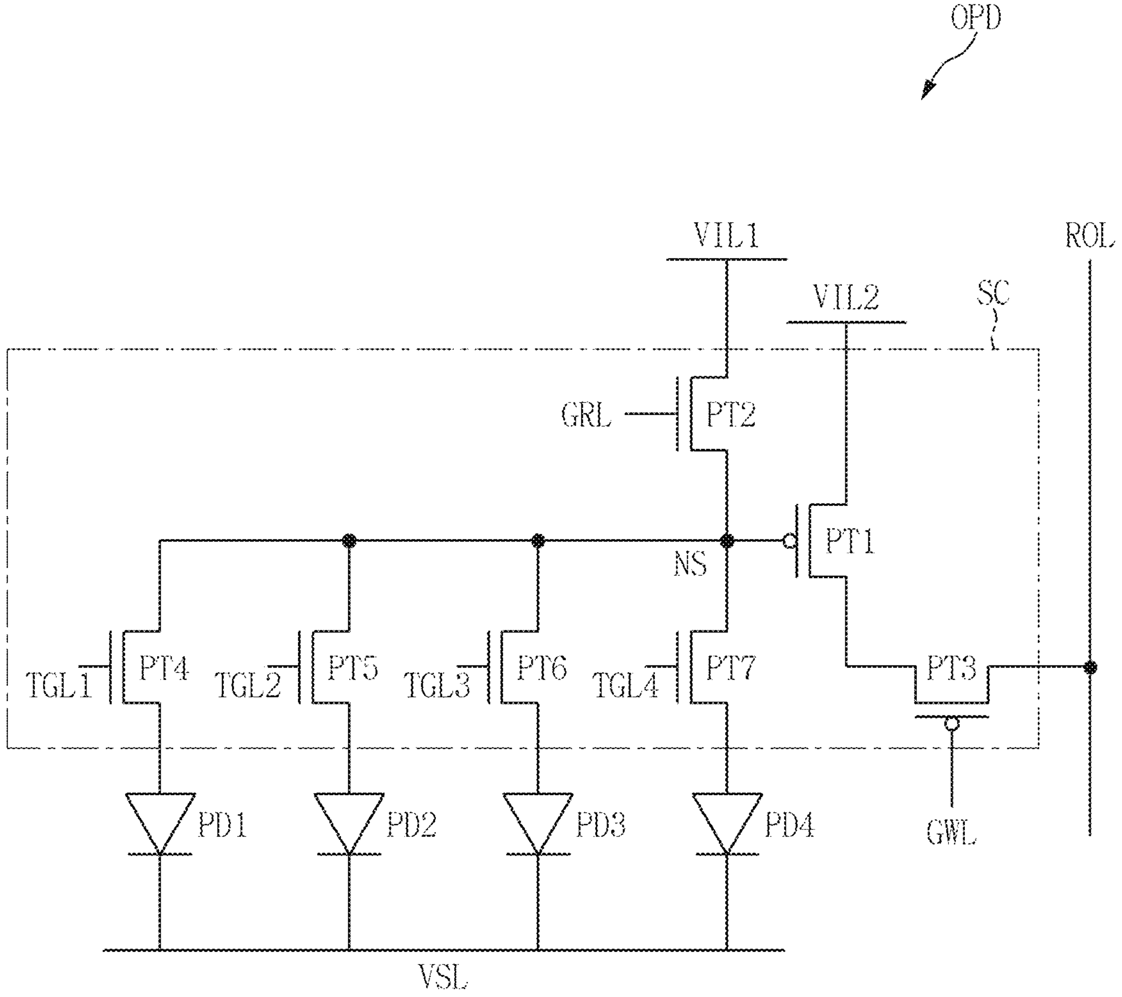
FIG. 13 is a circuit diagram of a fingerprint sensor of a display device according to another embodiment.

FIG. 13 is a circuit diagram of a fingerprint sensor of a display device according to another embodiment. The fingerprint sensor of FIG. 13 differs from the fingerprint sensor of FIG. 8 in the configuration of the fourth to seventh sensor transistors PT4, PT5, PT6, and PT7, and the same configuration will be briefly described or omitted.

Referring to FIG. 13, the fingerprint sensor OPD may be connected to the first gate line GWL, the reset signal line GRL, the first initialization voltage line VIL1, the second initialization voltage line VIL2, the first to fourth control lines TGL1, TGL2, TGL3, and TGL4, and the first read-out line ROL1.

The fingerprint sensor OPD may include first to fourth light receiving elements PD1, PD2, PD3, and PD4 and a sensor circuit SC for driving the first to fourth light receiving elements PD1, PD2, PD3, and PD4. The sensor circuit SC may include first to seventh sensor transistors PT1, PT2, PT3, PT4, PT5, PT6, and PT7.

The first sensor transistor PT1 may control a source-drain current Isd (hereinafter referred to as "sensing current") based on the voltage of the sensor node NS which is connected to the first electrodes of the light receiving elements PD1, PD2, PD3 and PD4 through a fourth sensor transistor PT4, a fifth sensor transistor PT5, a sixth sensor transistor PT6, and a seventh sensor transistor PT7, respectively. The gate electrode of the first sensor transistor PT1 may be connected to the sensor node NS, the first electrode thereof may be connected to the third sensor transistor PT3, and the second electrode thereof may be connected to the second initialization voltage line VIL2.

The second sensor transistor PT2 may be turned on in response to the reset signal of the reset signal line GRL, thereby discharging the sensor node NS to the first initialization voltage. The gate electrode of the second sensor transistor PT2 may be connected to the reset signal line GRL, the first electrode thereof may be connected to the sensor node NS, and the second electrode thereof may be connected to the first initialization voltage line VIL1.

The third sensor transistor PT3 may be turned on in response to the first gate signal of the first gate line GWL to electrically connect the first electrode of the first sensor transistor PT1 to the first read-out line ROL1. The gate electrode of the third sensor transistor PT3 may be connected to the first gate line GWL, the first electrode thereof may be connected to the first read-out line ROL1, and the second electrode thereof may be connected to the first electrode of the first sensor transistor PT1.

The fourth sensor transistor PT4 may be turned on in response to a first control signal of the first control line TGL1 to electrically connect the first electrode of the first light receiving element PD1 to the sensor node NS. The gate electrode of the fourth sensor transistor PT4 may be connected to the first control line TGL1, the first electrode thereof may be connected to the first electrode of the first light receiving element PD1, and the second electrode thereof may be connected to the sensor node NS. The first electrode of the fourth sensor transistor PT4 may be a drain electrode and the second electrode thereof may be a source electrode.

The fifth sensor transistor PT5 may be turned on in response to a second control signal of the second control line TGL2 to electrically connect the first electrode of the second light receiving element PD2 to the sensor node NS. The gate electrode of the fifth sensor transistor PT5 may be connected to the second control line TGL2, the first electrode thereof may be connected to the first electrode of the second light receiving element PD2, and the second electrode thereof may be connected to the sensor node NS. The first electrode of the fifth sensor transistor PT5 may be a drain electrode and the second electrode thereof may be a source electrode.

The sixth sensor transistor PT6 may be turned on in response to a third control signal of the third control line TGL3 to electrically connect the first electrode of the third light receiving element PD3 to the sensor node NS. The gate electrode of the sixth sensor transistor PT6 may be connected to the third control line TGL3, the first electrode thereof may be connected to the first electrode of the third light receiving element PD3, and the second electrode thereof may be connected to the sensor node NS. The first electrode of the sixth sensor transistor PT6 may be a drain electrode and the second electrode thereof may be a source electrode.

The seventh sensor transistor PT7 may be turned on in response to a fourth control signal of the fourth control line TGL4 to electrically connect the first electrode of the fourth light receiving element PD4 to the sensor node NS. The gate electrode of the seventh sensor transistor PT7 may be connected to the fourth control line TGL4, the first electrode thereof may be connected to the first electrode of the fourth light receiving element PD4, and the second electrode thereof may be connected to the sensor node NS. The first electrode of the seventh sensor transistor PT7 may be a drain electrode and the second electrode thereof may be a source electrode.

The first and third sensor transistors PT1 and PT3 may include a silicon-based semiconductor region. The first and third sensor transistors PT1 and PT3 may include a semiconductor region made of low temperature polycrystalline silicon (LTPS). The first and third sensor transistors PT1 and PT3 may correspond to p-type transistors.

The second, and fourth to seventh sensor transistors PT2, PT4, PT5, PT6, and PT7 may include an oxide-based semiconductor region. The second, and fourth to seventh sensor transistors PT2, PT4, PT5, PT6, and PT7 may have a coplanar structure in which the gate electrode is disposed on the oxide-based semiconductor region. The second, and fourth to seventh sensor transistors PT2, PT4, PT5, PT6, and PT7 may correspond to n-type transistors.

Figure 14:
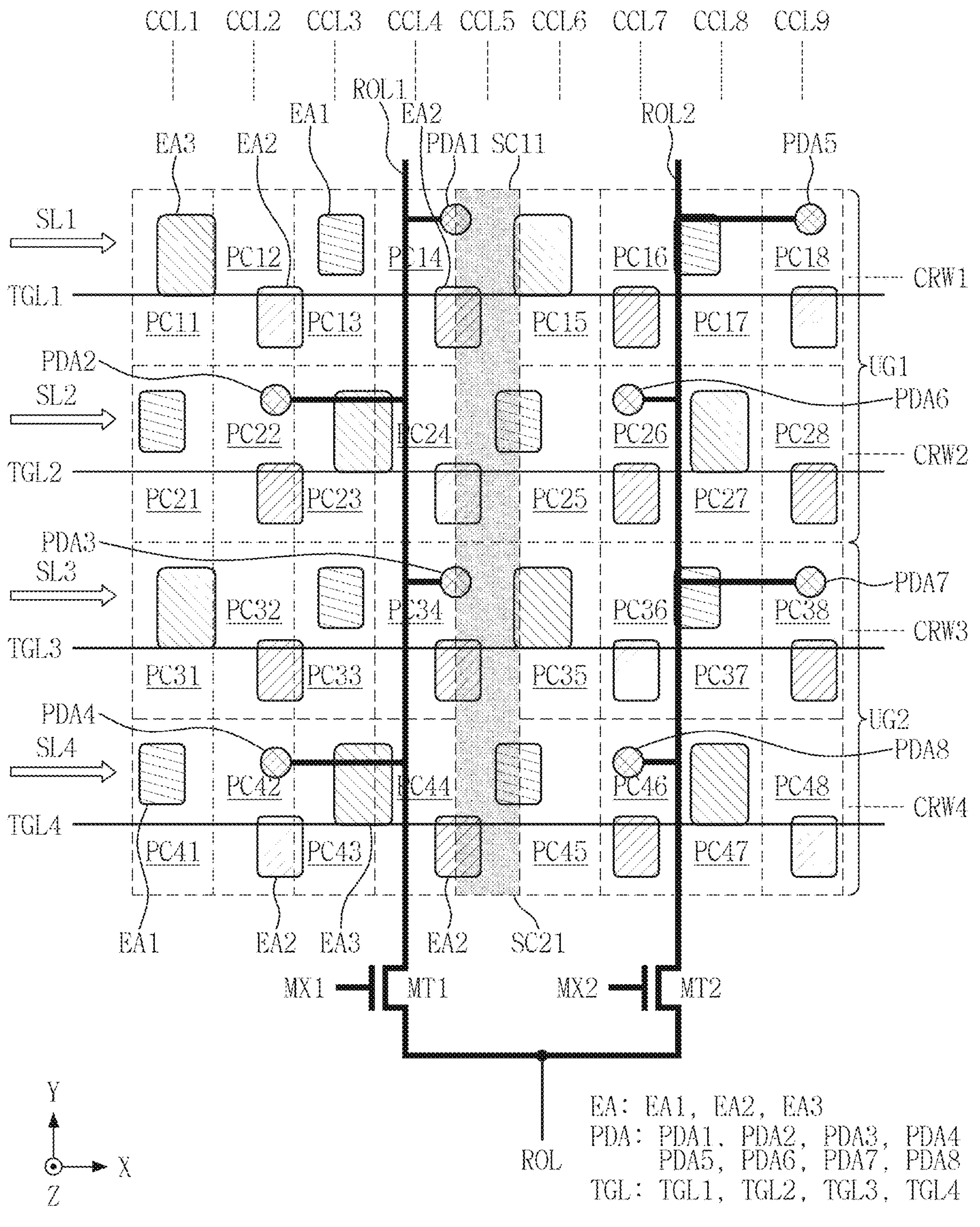
FIG. 14 is a plan view showing a pixel circuit and a sensor circuit of a display device according to another embodiment.

FIG. 14 is a plan view showing a pixel circuit and a sensor circuit of a display device according to another embodiment.

Referring to FIG. 14, a plurality of pixel circuits and a plurality of sensor circuits may be arranged along a plurality of rows and columns in the display area DA. For example, the pixel circuits and the sensor circuits may be arranged along the first to fourth circuit rows CRW1, CRW2, CRW3, and CRW4 and the first to ninth circuit columns CCL1, CCL2, CCL3, CCL4, CCL5, CCL6, CCL7, CCL8, and CCL9. Each of first to fourth scan lines SL1, SL2, SL3, and SL4 may supply a scan signal to the pixels SP and the fingerprint sensors OPD disposed in each of the first to fourth circuit rows CRW1, CRW2, CRW3, and CRW4. The pixel circuits and the sensor circuits may be disposed at a certain ratio in the display area DA. The display area DA includes the pixel circuits and the sensor circuits that are disposed at a certain ratio, and thus may include the pixels SP and the fingerprint sensors OPD that are disposed in the same layer. One pixel SP may include one light emitting element, and one fingerprint sensor OPD may include four light receiving elements. For example, the pixel circuits and the sensor circuits may be disposed at a ratio of 16:1, and the light emitting elements and light receiving elements may be disposed at a ratio of 4:1, but these ratios are not limited thereto. Accordingly, the display device 10 may improve the resolution of the pixels SP while maintaining the sensitivity of the fingerprint sensor OPD.

The pixels SP and the fingerprint sensors OPD disposed in the first and second circuit rows CRW1 and CRW2 and the first to ninth circuit columns CCL1, CCL2, CCL3, CCL4, CCL5, CCL6, CCL7, CCL8, and CCL9 may form the first unit group UG1. The first circuit row CRW1 may include the eleventh to eighteenth pixel circuits PC11, PC12, PC13, PC14, PC15, PC16, PC17, and PC18 and the eleventh sensor circuit SC11. The second circuit row CRW2 may include twenty-first to twenty-eighth pixel circuits PC21, PC22, PC23, PC24, PC25, PC26, PC27, and PC28 and the eleventh sensor circuit SC11. Accordingly, the eleventh sensor circuit SC11 may be disposed across the first and second circuit rows CRW1 and CRW2. The eleventh sensor circuit SC11 may be disposed between the fourteenth and fifteenth pixel circuits PC14 and PC15, and between the twenty-fourth, and twenty-fifth pixel circuits PC24 and PC25.

The eleventh pixel circuit PC11 may be disposed in an area corresponding to a third emission area EA3, the twelfth pixel circuit PC12 may be disposed in an area corresponding to a second emission area EA2, the thirteenth pixel circuit PC13 may be disposed in an area corresponding to a first emission area EA1, and the fourteenth pixel circuit PC14 may be disposed in an area corresponding to the second emission area EA2. One emission area EA may be an area corresponding to one pixel circuit PC and one light emitting element ED. One unit pixel may include one first emission area EA1, two second emission areas EA2, and one third emission area EA3 to express a white grayscale, but the configuration of the unit pixel is not limited thereto.

One fingerprint sensor OPD may include the eleventh sensor circuit SC11 and first to fourth sensor areas PDA1, PDA2, PDA3, and PDA4. One fingerprint sensor may include the first to fourth light receiving elements PD1, PD2, PD3, and PD4, and the first to fourth light receiving elements PD1, PD2, PD3, and PD4 may receive light through the first to fourth sensor areas PDA1, PDA2, PDA3, and PDA4, respectively. One of the first to fourth control lines TGL1, TGL2, TGL3, and TGL4 may supply a control signal to select one of the first to fourth light receiving elements PD1, PD2, PD3, and PD4, and the selected light receiving element PD may receive light to generate a sensing signal. Accordingly, the first unit group UG1 may include four unit pixels and one fingerprint sensor OPD. The first unit group UG1 may include sixteen pixel circuits PC and one sensor circuit SC, and may include sixteen light emitting elements ED and four light receiving elements PD. Accordingly, the display device 10 may maintain the sensitivity of the fingerprint sensor OPD in a high-resolution display product.

The pixel SP and the fingerprint sensor OPD disposed in the third and fourth circuit rows CRW3 and CRW4 and the first to ninth circuit columns CCL1, CCL2, CCL3, CCL4, CCL5, CCL6, CCL7, CCL8, and CCL9 may form the second unit group UG2. The third circuit row CRW3 may include thirty-first to thirty-eighth pixel circuits PC31, PC32, PC33, PC34, PC35, PC36, PC37, and PC38 and the twenty-first sensor circuit SC21. The fourth circuit row CRW4 may include forty-first to forty-eighth pixel circuits PC41, PC42, PC43, PC44, PC45, PC46, PC47, and PC48 and the twenty-first sensor circuit SC21. Accordingly, the twenty-first sensor circuit SC21 may be disposed across the third and fourth circuit rows CRW3 and CRW4. The twenty-first sensor circuit SC21 may be disposed between the thirty-fourth and thirty-fifth pixel circuits PC34 and PC35, and between the forty-fourth and forty-fifth pixel circuits 44, and PC45.

The fingerprint sensor OPD of the second unit group UG2 may include the twenty-first sensor circuit SC21 and fifth to eighth sensor areas PDA5, PDA6, PDA7, and PDA8. The fingerprint sensor OPD of the second unit group UG2 may include the fifth to eighth light receiving elements PD5, PD6, PD7, and PD8, and the fifth to eighth light receiving elements PD5, PD6, PD7, and PD8 may receive light through the fifth to eighth sensor areas PDA5, PDA6, PDA7, and PDA8, respectively. Accordingly, the second unit group UG2 may include four unit pixels and one fingerprint sensor OPD.

The first and fifth sensor areas PDA1 and PDA5 may overlap the pixel circuits of the first circuit row CRW1. The second and sixth sensor areas PDA2 and PDA6 may overlap the pixel circuits of the second circuit row CRW2. The third and seventh sensor areas PDA3 and PDA7 may overlap the pixel circuits of the third circuit row CRW3. The fourth and eighth sensor areas PDA4 and PDA8 may overlap the pixel circuits of the fourth circuit row CRW4.

The first to fourth control lines TGL1, TGL2, TGL3, and TGL4 may extend in the X-axis direction and be spaced apart from each other in the Y-axis direction. Each of the first to fourth control lines TGL1, TGL2, TGL3, and TGL4 may intersect each of the first read-out line ROL1 and a second read-out line ROL2. The first to fourth control lines TGL1, TGL2, TGL3, and TGL4 may be disposed in parallel with the first to fourth scan lines SL1, SL2, SL3, and SL4. The first control line TGL1 may overlap the first circuit row CRW1, the second control line TGL2 may overlap the second circuit row CRW2, the third control line TGL3 may overlap the third circuit row CRW3, and the fourth control line TGL4 may overlap the fourth circuit row CRW4, but the present disclosure is not limited thereto. The first and second read-out lines ROL1 and ROL2 may extend in the Y-axis direction and be spaced apart from each other in the X-axis direction. The eleventh sensor circuit SC11 may be connected to the first read-out line ROL1, and the twenty-first sensor circuit SC21 may be connected to the second read-out line ROL2. The first read-out line ROL1 may be electrically connected to the first to fourth light receiving elements PD1, PD2, PD3, and PD4, and the second read-out line ROL2 may be electrically connected to the fifth to eighth light receiving elements PD5, PD6, PD7, and PD8.

The first read-out line ROL1 may be electrically connected to the read-out line ROL through a first MUX transistor MT1. The second read-out line ROL2 may be electrically connected to the read-out line ROL through a second MUX transistor MT2. The first MUX transistor MT1 may electrically connect the first read-out line ROL1 to the read-out line ROL in response to a first MUX signal MX1. The second MUX transistor MT2 may electrically connect the second read-out line ROL2 to the read-out line ROL in response to a second MUX signal MX2. Accordingly, the read-out line ROL may electrically connect the first or second read-out line ROL1 or ROL2 to the display driver 200 in response to the first or second MUX signal MX1 or MX2.

Figure 15:
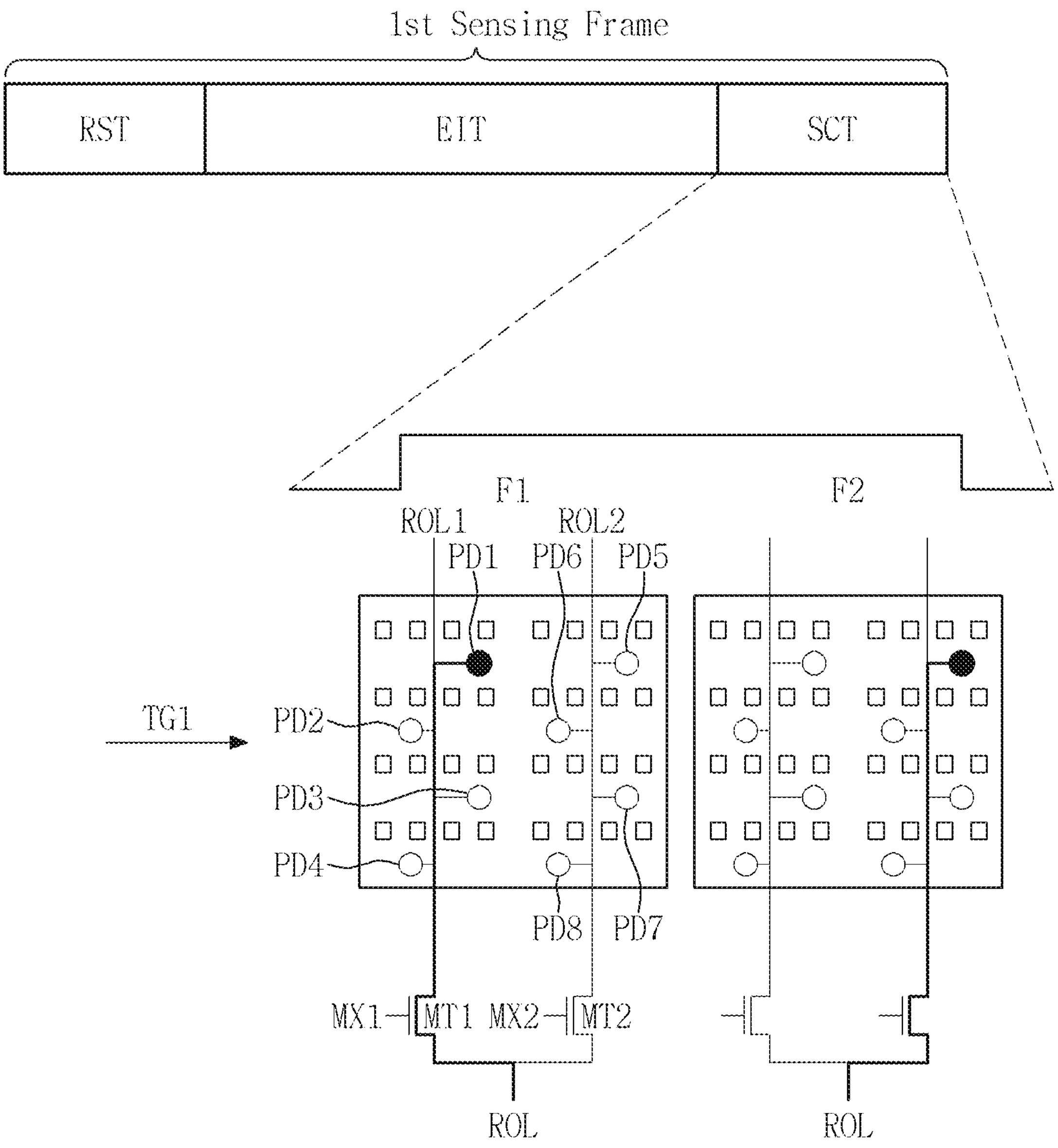
FIG. 15 is a diagram illustrating an operation of a first sensing frame in a display device according another embodiment.

FIG. 15 is a diagram illustrating an operation of a first sensing frame in a display device according another embodiment.

Referring to FIG. 15, the first sensing frame (1st Sensing Frame) may include the reset period RST, the hold period EIT, and the sensing period SCT.

Referring to FIG. 15 in conjunction with FIGS. 13 and 14, the fingerprint sensor OPD may initialize the voltage of the sensor node NS during the reset period RST. The second sensor transistor PT2 of each of the eleventh and twenty-first sensor circuits SC11 and SC21 may be turned on in response to a reset signal during the reset period RST, and the sensor node NS may be discharged to the first initialization voltage.

The first light receiving element PD1 and the fifth light receiving element PD5 may receive reflected light during the hold period EIT. The first and fifth light receiving elements PD1 and PD5 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of the first sensing frame (1st Sensing Frame). The fourth sensor transistor PT4 of the eleventh sensor circuit SC11 may receive the first control signal TG1 from the first control line TGL1 during the first frame period F1. The sensing signal from the first light receiving element PD1 may be supplied to the display driver 200 through the first read-out line ROL1, the first MUX transistor MT1, and the read-out line ROL during the first frame period F1 of the first sensing frame (1st Sensing Frame).

The twenty-first sensor circuit SC21 may be driven during the second frame period F2 of the first sensing frame (1st Sensing Frame). The fourth sensor transistor PT4 of the twenty-first sensor circuit SC21 may receive the first control signal TG1 from the first control line TGL1 during the second frame period F2. The sensing signal from the fifth light receiving element PD5 may be applied to the display driver 200 through the second read-out line ROL2, the second MUX transistor MT2, and the read-out line ROL during the second frame period F2 of the first sensing frame (1st Sensing Frame).

Figure 16:
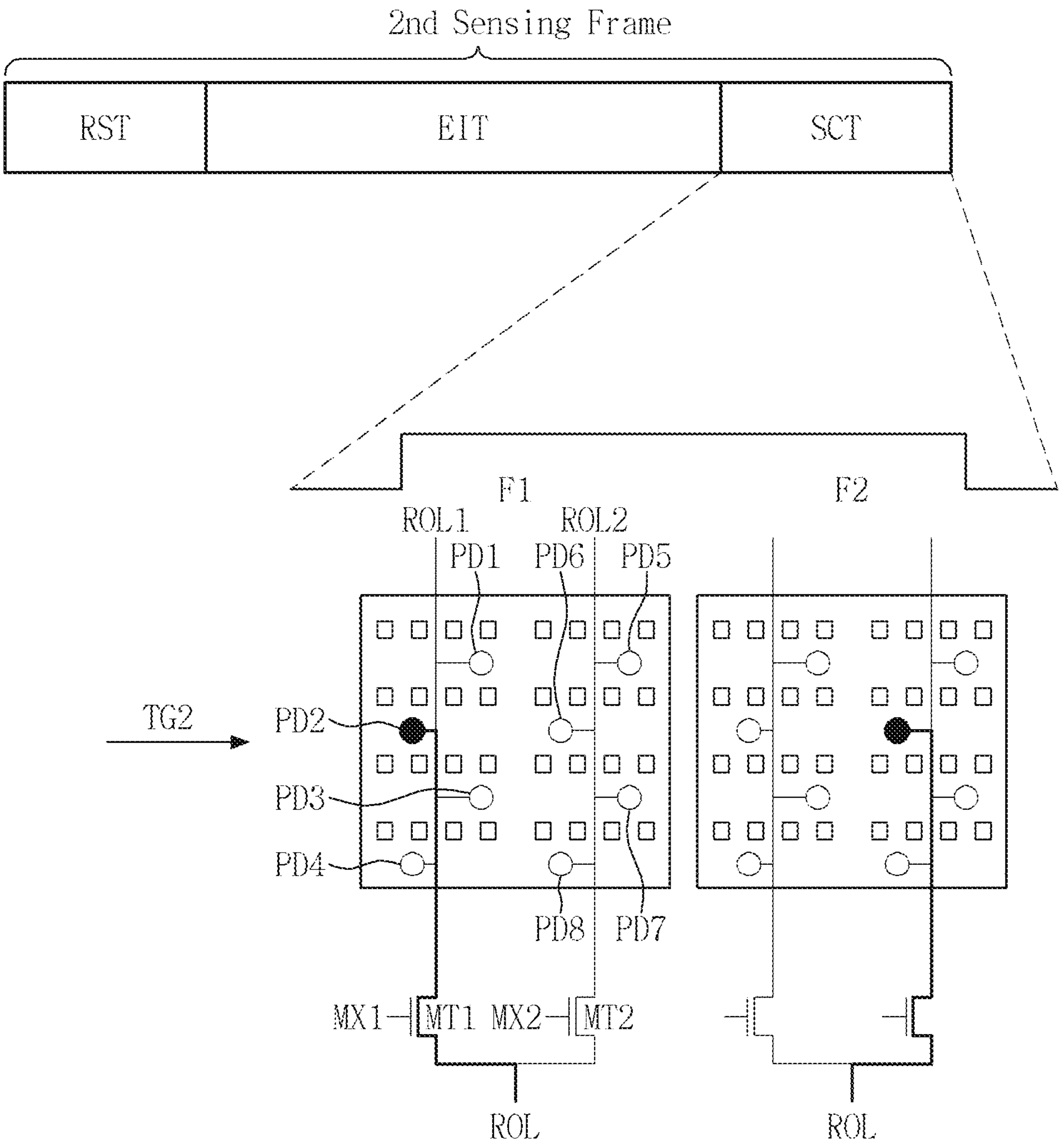
FIG. 16 is a diagram illustrating an operation of a second sensing frame in a display device according another embodiment.

FIG. 16 is a diagram illustrating an operation of a second sensing frame in a display device according another embodiment.

Referring to FIG. 16, the second sensing frame (2nd Sensing Frame) may include the reset period RST, the hold period EIT, and the sensing period SCT.

Referring to FIG. 16 in conjunction with FIGS. 13 and 14, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The second light receiving element PD2 and the sixth light receiving element PD6 may receive reflected light during the hold period EIT. The second and sixth light receiving elements PD2 and PD6 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of the second sensing frame (2nd Sensing Frame). The fifth sensor transistor PT5 of the eleventh sensor circuit SC11 may receive the second control signal TG2 from the second control line TGL2 during the first frame period F1. The sensing signal from the second light receiving element PD2 may be supplied to the display driver 200 through the first read-out line ROL1, the first MUX transistor MT1, and the read-out line ROL during the first frame period F1 of the second sensing frame (2nd Sensing Frame).

The twenty-first sensor circuit SC21 may be driven during the second frame period F2 of the second sensing frame (2nd Sensing Frame). The fifth sensor transistor PT5 of the twenty-first sensor circuit SC21 may receive the second control signal TG2 from the second control line TGL2 during the second frame period F2. The sensing signal from the sixth light receiving element PD6 may be supplied to the display driver 200 through the second read-out line ROL2, the second MUX transistor MT2, and the read-out line ROL during the second frame period F2 of the second sensing frame (2nd Sensing Frame).

Figure 17:
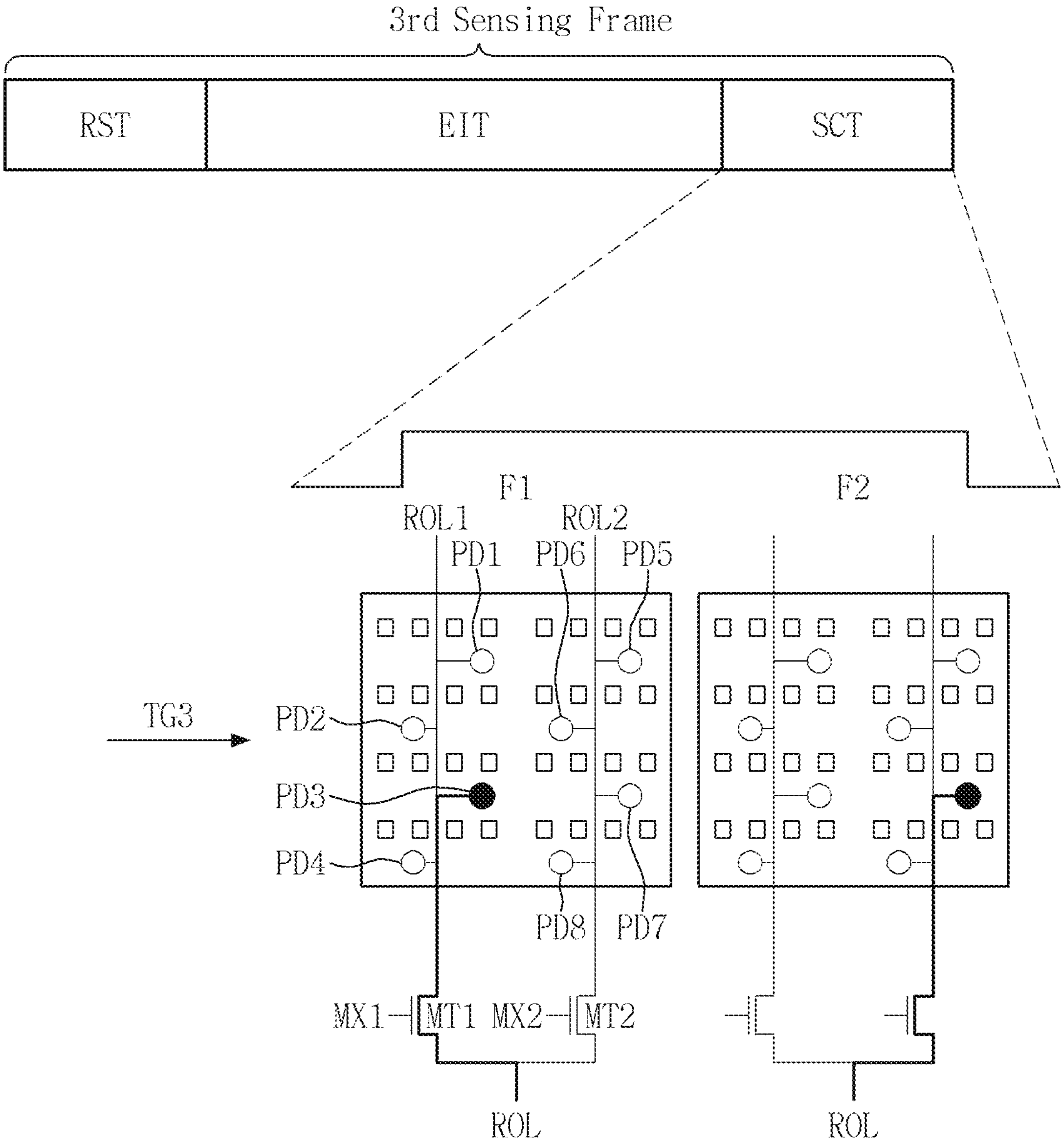
FIG. 17 is a diagram illustrating an operation of a third sensing frame in a display device according another embodiment.

FIG. 17 is a diagram illustrating an operation of a third sensing frame in a display device according another embodiment.

Referring to FIG. 17, the third sensing frame (3rd Sensing Frame) may include the reset period RST, the hold period EIT, and the sensing period SCT.

Referring to FIG. 17 in conjunction with FIGS. 13 and 14, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The third light receiving element PD3 and the seventh light receiving element PD7 may receive reflected light during the hold period EIT. The third and seventh light receiving elements PD3 and PD7 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of the third sensing frame (3rd Sensing Frame). The sixth sensor transistor PT6 of the eleventh sensor circuit SC11 may receive the third control signal TG3 from the third control line TGL3 during the first frame period F1. The sensing signal from the third light receiving element PD3 may be supplied to the display driver 200 through the first read-out line ROL1, the first MUX transistor MT1, and the read-out line ROL during the first frame period F1 of the third sensing frame (3rd Sensing Frame).

The twenty-first sensor circuit SC21 may be driven during the second frame period F2 of the third sensing frame (3rd Sensing Frame). The sixth sensor transistor PT6 of the twenty-first sensor circuit SC21 may receive the third control signal TG3 from the third control line TGL3 during the second frame period F2. The sensing signal from the seventh light receiving element PD7 may be supplied to the display driver 200 through the second read-out line ROL2, the second MUX transistor MT2, and the read-out line ROL during the second frame period F2 of the third sensing frame (3rd Sensing Frame).

Figure 18:
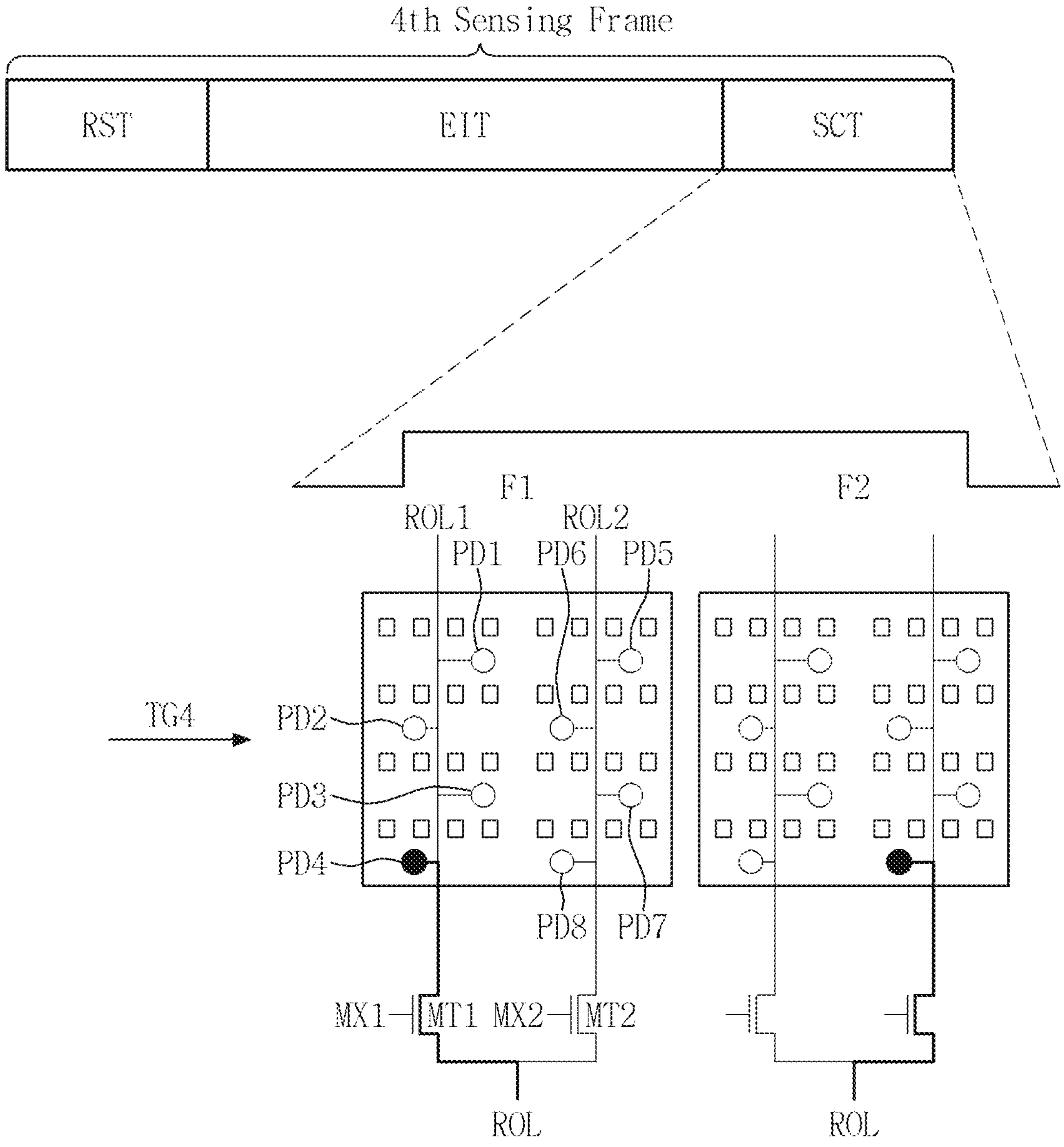
FIG. 18 is a diagram illustrating an operation of a fourth sensing frame in a display device according another embodiment.

FIG. 18 is a diagram illustrating an operation of a fourth sensing frame in a display device according another embodiment.

Referring to FIG. 18, the fourth sensing frame (4th Sensing Frame) may include the reset period RST, the hold period EIT, and the sensing period SCT.

Referring to FIG. 18 in conjunction with FIGS. 13 and 14, the fingerprint sensor OPD may initialize the voltage of the sensor node NS during the reset period RST. The second sensor transistor PT2 of each of the eleventh and twenty-first sensor circuits SC11 and SC21 may be turned on by receiving a reset signal during the reset period RST, and the sensor node NS may be discharged to the first initialization voltage.

The fourth light receiving element PD4 and an eighth light receiving element PD8 may receive reflected light during the hold period EIT. The fourth and eighth light receiving elements PD4 and PD8 may receive light that has been output from the light emitting element ED and then reflected by the ridges and/or valleys of the finger.

The sensing period SCT may include first and second frame periods F1 and F2. The eleventh sensor circuit SC11 may be driven during the first frame period F1 of the fourth sensing frame (4th Sensing Frame). The seventh sensor transistor PT7 of the eleventh sensor circuit SC11 may receive the fourth control signal TG4 from the fourth control line TGL4 during the first frame period F1. The sensing signal from the fourth light receiving element PD4 may be supplied to the display driver 200 through the first read-out line ROL1, the first MUX transistor MT1, and the read-out line ROL during the first frame period F1 of the fourth sensing frame (4th Sensing Frame).

The twenty-first sensor circuit SC21 may be driven during the second frame period F2 of the fourth sensing frame (4th Sensing Frame). The seventh sensor transistor PT7 of the twenty-first sensor circuit SC21 may receive the fourth control signal TG4 from the fourth control line TGL4 during the second frame period F2. The sensing signal from the eighth light receiving element PD8 may be supplied to the display driver 200 through the second read-out line ROL2, the second MUX transistor MT2, and the read-out line ROL during the second frame period F2 of the fourth sensing frame (4th Sensing Frame).

Figure 19:
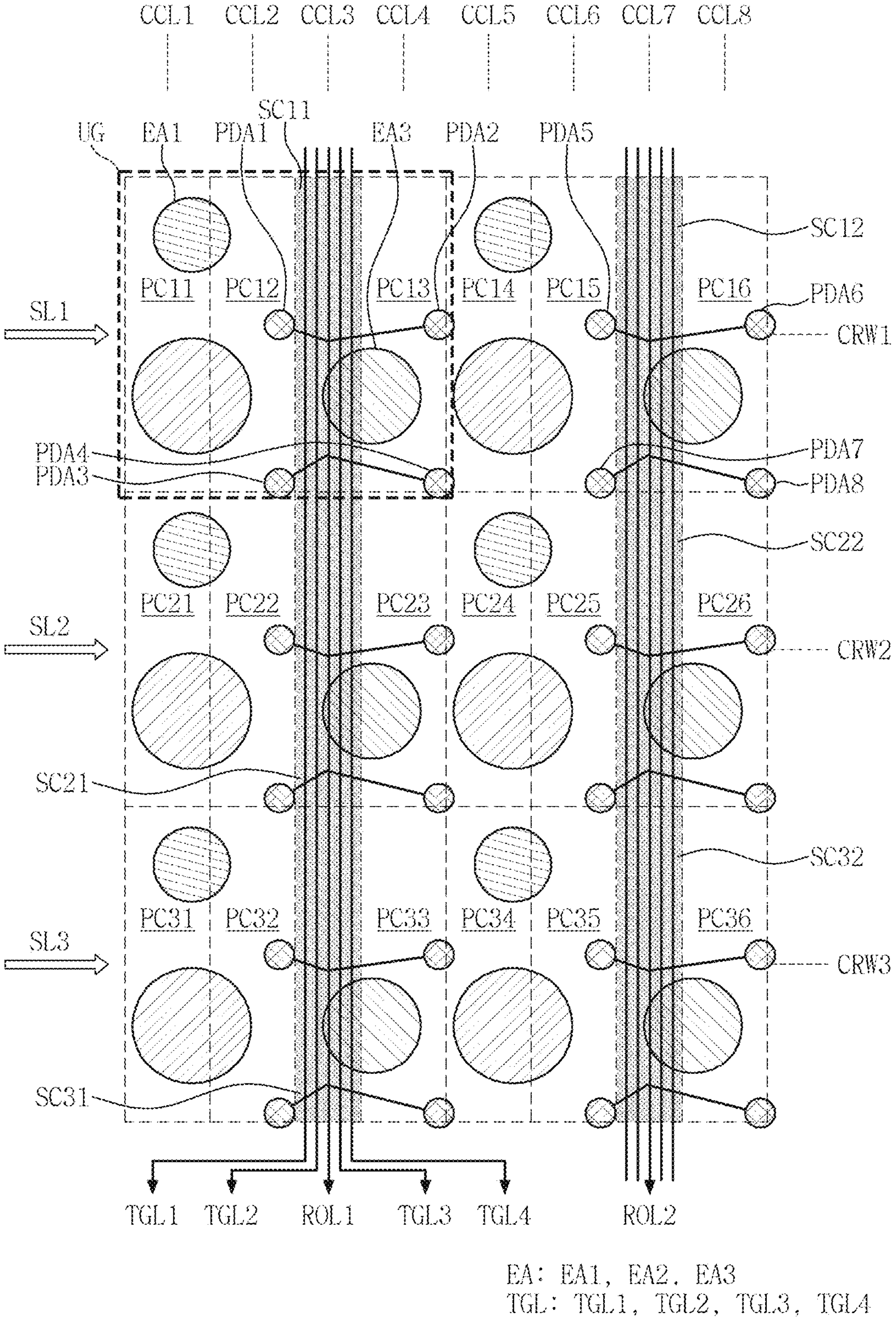
FIG. 19 is a plan view showing a pixel circuit and a sensor circuit of a display device according to still another embodiment.

FIG. 19 is a plan view showing a pixel circuit and a sensor circuit of a display device according to still another embodiment.

Referring to FIG. 19, a plurality of pixel circuits and a plurality of sensor circuits may be arranged along a plurality of rows and columns in the display area DA. For example, the pixel circuits and the sensor circuits may be arranged along the first to third circuit rows CRW1, CRW2, and CRW3 and the first to eighth circuit columns CCL1, CCL2, CCL3, CCL4, CCL5, CCL6, CCL7, and CCL8. The first to third scan lines SL1, SL2, and SL3 may supply a scan signal to the pixels SP and the fingerprint sensors OPD disposed in each of the first to third circuit rows CRW1, CRW2, and CRW3, respectively. The pixel circuits and the sensor circuits may be disposed at a certain ratio in the display area DA. The display area DA includes the pixel circuits and the sensor circuits that are disposed at a certain ratio, and thus may include the pixels SP and the fingerprint sensors OPD that are disposed in the same layer. One pixel SP may include one light emitting element and one fingerprint sensor OPD may include four light receiving elements. For example, the pixel circuits and the sensor circuits may be disposed at a ratio of 3:1, and the light emitting elements and the light receiving elements may be disposed at a ratio of 3:4, but these ratios are not limited thereto. Accordingly, the display device 10 may implement a high-resolution fingerprint sensor OPD while maintaining the resolution of the pixels SP.

The pixels SP and fingerprint sensors OPD disposed in the first circuit row CRW1 and the first to fourth circuit columns CCL1, CCL2, CCL3, and CCL4 may form one unit group UG. The first circuit row CRW1 may include the eleventh to sixteenth pixel circuits PC11, PC12, PC13, PC14, PC15, and PC16, the eleventh sensor circuit SC11, and a twelfth sensor circuit SC12. The eleventh sensor circuit SC11 may be disposed between the twelfth pixel circuit PC12 and the thirteenth pixel circuit PC13, and the twelfth sensor circuit SC12 may be disposed between the fifteenth pixel circuit PC15 and the sixteenth pixel circuit PC16.

The second circuit row CRW2 may include the twenty-first to twenty-sixth pixel circuits PC21, PC22, PC23, PC24, PC25, and PC26, the twenty-first sensor circuit SC21, and a twenty-second sensor circuit SC22. The twenty-first sensor circuit SC21 may be disposed between the twenty-second and twenty-third pixel circuits PC22 and PC23, and the twenty-second sensor circuit SC22 may be disposed between the twenty-fifth and twenty-sixth pixel circuits PC25 and PC26.

The third circuit row CRW3 may include the thirty-first to thirty-sixth pixel circuits PC31, PC32, PC33, PC34, PC35, and PC36, and thirty-first and thirty-second sensor circuits SC31 and SC32. The thirty-first sensor circuit SC31 may be disposed between the thirty-second and thirty-third pixel circuits PC32 and PC33, and the thirty-second sensor circuit SC32 may be disposed between the thirty-fifth and thirty-sixth pixel circuits PC35 and PC36.

The eleventh pixel circuit PC11 may be disposed in an area corresponding to the first emission area EA1, the twelfth pixel circuit PC12 may be disposed in an area corresponding to the second emission area EA2, and the thirteenth pixel circuit PC13 may be disposed in an area corresponding to the third emission area EA3. One unit pixel may represent a white gray scale by including one first emission area EA1, one second emission area EA2, and one third emission area EA3, but the configuration of the unit pixel is not limited thereto.

The first and second read-out lines ROL1 and ROL2, and the first to fourth control lines TGL1, TGL2, TGL3, and TGL4 may extend in the Y-axis direction and be spaced apart from each other in the X-axis direction. The eleventh, twenty-first, and thirty-first sensor circuits SC11, SC21, and SC31 may be connected to the first read-out line ROL1, and the twelfth, twenty-second, and thirty-second sensor circuits SC12, SC22, and SC32 may be connected to the second read-out line ROL2. One fingerprint sensor OPD may include the eleventh sensor circuit SC11 and first to fourth sensor areas PDA1, PDA2, PDA3, and PDA4. One fingerprint sensor may include the first to fourth light receiving elements PD1, PD2, PD3, and PD4, and the first to fourth light receiving elements PD1, PD2, PD3, and PD4 may receive light through the first to fourth sensor areas PDA1, PDA2, PDA3, and PDA4, respectively. One of the first to fourth control lines TGL1, TGL2, TGL3, and TGL4 may supply a control signal to select one of the first to fourth light receiving elements PD1, PD2, PD3, and PD4, and the selected light receiving element PD may receive light to generate a sensing signal. Accordingly, one unit group UG may include one unit pixel and one fingerprint sensor OPD. One unit group UG may include three pixel circuits and one sensor circuit, and may include three light emitting elements ED and four light receiving elements PD. Accordingly, the display device 10 may implement a high-resolution fingerprint sensor OPD while maintaining the resolution of the pixels SP.

The current disclosure should not be construed as being limited to the embodiments set forth herein. Rather, these embodiments are provided so that this disclosure will be thorough and complete and will fully convey the concept of the present disclosure to those skilled in the art.

While the current disclosure have been particularly shown and described with reference to some embodiments thereof, it will be understood by one of ordinary skill in the art that various changes in form and detail may be made therein without departing from the spirit and scope of the current disclosure as defined by the following claims.

What is claimed is:

1. A fingerprint sensor comprising:

a read-out line extending in a first direction;

first and second light receiving elements receiving light;

a first sensor transistor configured to control a sensing current based on a voltage of a sensor node;

a second sensor transistor configured to discharge the sensor node to a first initialization voltage in response to a reset signal;

a third sensor transistor electrically connecting a first electrode of the first sensor transistor to the read-out line in response to a gate signal;

a fourth sensor transistor electrically connecting the sensor node to the first light receiving element in response to a first control signal; and a fifth sensor transistor electrically connecting the sensor node to the second light receiving element in response to a second control signal, wherein the first light receiving element and the second light receiving element are disposed in different circuit rows and different circuit columns, and output respective sensing signals through a same read-out line.

2. The fingerprint sensor of claim 1, wherein the first light receiving element is configured to drive during a first sensing frame and the second light receiving element is configured to drive during a second sensing frame after the first sensing frame, and wherein each of the first and second sensing frames comprises:

a reset period in which the second sensor transistor is turned on to discharge the sensor node;

a hold period in which the first or second light receiving element receives light after the reset period; and a sensing period in which the first and third sensor transistors are turned on after the hold period.

3. The fingerprint sensor of claim 2, wherein the fourth sensor transistor is configured to be turned on during the sensing period of the first sensing frame to supply a sensing signal from the first light receiving element to the read-out line, and wherein the fifth sensor transistor is configured to be turned on during the sensing period of the second sensing frame to supply a sensing signal from the second light receiving element to the read-out line.

4. The fingerprint sensor of claim 3, further comprising:

third and fourth light receiving elements configured to receive light;

a sixth sensor transistor electrically connecting the sensor node to the third light receiving element in response to a third control signal; and a seventh sensor transistor electrically connecting the sensor node to the fourth light receiving element in response to a fourth control signal.

5. The fingerprint sensor of claim 4, wherein the third light receiving element is configured to drive during a third sensing frame after the second sensing frame, the fourth light receiving element is configured to drive during a fourth sensing frame after the third sensing frame, and each of the third and fourth sensing frames comprises:

a reset period in which the second sensor transistor is turned on to discharge the sensor node;

a hold period in which the third or fourth light receiving element receives light after the reset period; and a sensing period in which the first and third sensor transistors are turned on after the hold period, wherein the sixth sensor transistor is configured to be turned on during the sensing period of the third sensing frame to supply a sensing signal from the third light receiving element to the read-out line, and the seventh sensor transistor is configured to be turned on during the sensing period of the fourth sensing frame to supply a sensing signal from the fourth light receiving element to the read-out line.

6. The fingerprint sensor of claim 4, wherein the second sensor transistor comprises an oxide-based semiconductor, and wherein the first, and third to seventh sensor transistors comprise a silicon-based semiconductor.

7. The fingerprint sensor of claim 4, wherein the second, and fourth to seventh sensor transistors comprise an oxide-based semiconductor, and wherein the first and third sensor transistors comprise a silicon-based semiconductor.

8. A display device comprising:

a plurality of pixel circuits sequentially disposed in a first circuit row;

a plurality of pixel circuits sequentially disposed in a second circuit row following the first circuit row;

a first sensor circuit disposed between the pixel circuits in the first and second circuit rows;

a plurality of light emitting elements electrically connected to the plurality of pixel circuits, respectively, and disposed in the first and second circuit rows;

first and second light receiving elements electrically connected to the first sensor circuit and disposed in the first and second circuit rows, respectively; and a read-out line electrically connected to the first sensor circuit and extending in a first direction, wherein the first sensor circuit is configured to supply a sensing signal from the first light receiving element to the read-out line during a first frame period of a first sensing frame, and supply a sensing signal from the second light receiving element to the read-out line during a first frame period of a second sensing frame after the first sensing frame, and wherein the first light receiving element and the second light receiving element are disposed in different circuit rows and different circuit columns, and output respective sensing signals through a same read-out line.

9. The display device of claim 8, further comprising:

a plurality of pixel circuits sequentially disposed in a third circuit row following the second circuit row;

a plurality of pixel circuits sequentially disposed in a fourth circuit row following the third circuit row;

a second sensor circuit disposed between the pixel circuits in the third and fourth circuit rows and electrically connected to the read-out line; and third and fourth light receiving elements electrically connected to the second sensor circuit and disposed in the third and fourth circuit rows, respectively.

10. The display device of claim 9, wherein the second sensor circuit is configured to supply a sensing signal from the third light receiving element to the read-out line during a second frame period, after the first frame period, of the first sensing frame, and supply a sensing signal from the fourth light receiving element to the read-out line during a second frame period, after the first frame period, of the second sensing frame.

11. The display device of claim 9, further comprising first and second control lines extending in the first direction and configured to supply first and second control signals to the first and second sensor circuits, respectively.

12. The display device of claim 11, wherein each of the first and second sensor circuits comprises:

a first sensor transistor configured to control a sensing current based on a voltage of a sensor node;

a second sensor transistor configured to discharge the sensor node to a first initialization voltage in response to a reset signal;

a third sensor transistor electrically connecting a first electrode of the first sensor transistor to the read-out line in response to a gate signal;

a fourth sensor transistor electrically connecting the sensor node to the first light receiving element in response to the first control signal; and a fifth sensor transistor electrically connecting the sensor node to the second light receiving element in response to the second control signal.

13. The display device of claim 12, wherein the third sensor transistor of the first sensor circuit is configured to be turned on in response to a first gate signal applied to the pixel circuits disposed in the first or second circuit row, and the third sensor transistor of the second sensor circuit is configured to be turned on in response to a second gate signal applied to the pixel circuits disposed in the third or fourth circuit row.

14. The display device of claim 9, wherein the first and second light receiving elements overlap the pixel circuits disposed in the first and second circuit rows, and wherein the third and fourth light receiving elements overlap the pixel circuits disposed in the third and fourth circuit rows.

15. A display device comprising:

a plurality of pixel circuits sequentially disposed in a first circuit row;

a first sensor circuit disposed between adjacent pixel circuits in the first circuit row;

a first read-out line electrically connected to the first sensor circuit and extending in a first direction;

first and second light receiving elements electrically connected to the first sensor circuit;

a plurality of pixel circuits sequentially disposed in a second circuit row following the first circuit row;

a second sensor circuit disposed between adjacent pixel circuits in the second circuit row;

a second read-out line electrically connected to the second sensor circuit and extending in the first direction;

a first MUX transistor configured to be turned on in response to a first MUX signal and connected to the first read-out line;

a second MUX transistor configured to be turned on in response to a second MUX signal, and connected to the second read-out line; and a read-out line selectively connected to the first or second read-out line by the first or second MUX transistor, wherein the first light receiving element and the second light receiving element are disposed in different circuit rows and different circuit columns, and output respective sensing signals through a same read-out line.

16. The display device of claim 15, further comprising:

the first light receiving element electrically connected to the first sensor circuit and disposed in the first circuit row;

the second light receiving element electrically connected to the first sensor circuit and disposed in the second circuit row;

a third light receiving element electrically connected to the second sensor circuit and disposed in the first circuit row; and a fourth light receiving element electrically connected to the second sensor circuit and disposed in the second circuit row.

17. The display device of claim 16, wherein the first sensor circuit is configured to supply a sensing signal from the first light receiving element to the first read-out line during a first frame period of a first sensing frame, and wherein the second sensor circuit is configured to supply a sensing signal from the third light receiving element to the second read-out line during a second frame period, after the first frame period, of the first sensing frame.

18. The display device of claim 17, wherein the first sensor circuit is configured to supply a sensing signal from the second light receiving element to the first read-out line during a first frame period of a second sensing frame after the first sensing frame, and wherein the second sensor circuit is configured to supply a sensing signal from the fourth light receiving element to the second read-out line during a second frame period, after the first frame period, of the second sensing frame.

19. The display device of claim 16, further comprising first and second control lines extending in a second direction intersecting the first direction and configured to supply first and second control signals to the first and second sensor circuits, respectively.

20. The display device of claim 19, wherein each of the first and second sensor circuits comprises:

a first sensor transistor configured to control a sensing current based on a voltage of a sensor node;

a second sensor transistor configured to discharge the sensor node to a first initialization voltage in response to a reset signal;

a third sensor transistor electrically connecting a first electrode of the first sensor transistor to the first or second read-out line in response to a gate signal;

a fourth transistor electrically connecting the sensor node to the first light receiving element in response to the first control signal; and a fifth sensor transistor electrically connecting the sensor node to the second light receiving element in response to the second control signal.

* * * * *